United States Patent
Choi et al.

(10) Patent No.: US 12,214,320 B2
(45) Date of Patent: Feb. 4, 2025

(54) SEPARATOR MEMBRANE HAVING HIERARCHICAL STRUCTURE COMPRISING MESOPORES, PRODUCTION METHOD THEREFOR AND XYLENE SEPARATION METHOD USING SAME

(71) Applicant: KOREA UNIVERSITY RESEARCH AND BUSINESS FOUNDATION, Seoul (KR)

(72) Inventors: Jungkyu Choi, Seoul (KR); Kwan-Young Lee, Seoul (KR); Sungwon Hong, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 253 days.

(21) Appl. No.: 17/763,628

(22) PCT Filed: Sep. 24, 2020

(86) PCT No.: PCT/KR2020/013000
§ 371 (c)(1),
(2) Date: Mar. 24, 2022

(87) PCT Pub. No.: WO2021/060887
PCT Pub. Date: Apr. 1, 2021

(65) Prior Publication Data
US 2022/0331748 A1    Oct. 20, 2022

(30) Foreign Application Priority Data
Sep. 25, 2019  (KR) .................. 10-2019-0118060

(51) Int. Cl.
*B01D 71/02*      (2006.01)
*B01D 67/00*      (2006.01)
(Continued)

(52) U.S. Cl.
CPC ....... *B01D 71/028* (2013.01); *B01D 67/0006* (2013.01); *B01D 67/0095* (2013.01);
(Continued)

(58) Field of Classification Search
None
See application file for complete search history.

(56) References Cited

U.S. PATENT DOCUMENTS 6,376,733 B1   4/2002  Ferraro et al.
6,646,177 B2   11/2003 Takahashi et al.
(Continued)

FOREIGN PATENT DOCUMENTS

JP    2010-180080 A    8/2010
JP    2018-158909 A    10/2018
(Continued)

OTHER PUBLICATIONS

Algieri, C., et al. "Permeation properties of a thin silicalite-1 (MFI) membrane." *Journal of membrane science* 222.1-2 (2003): 181-190.
(Continued)

*Primary Examiner* — Tam M Nguyen
(74) *Attorney, Agent, or Firm* — NSIP Law

(57) ABSTRACT

The present invention relates to a separator membrane having a hierarchical structure, a production method therefor and a xylene separation method using same, and to: a separator membrane having a hierarchical structure comprising mesopores, the separator membrane having mesopores introduced inside a microporous zeolite separator membrane, thereby being thin, having less defects and exhibiting high xylene permeation and separation performance; a production method therefor; and a xylene separation method using same.

1 Claim, 14 Drawing Sheets

(51) Int. Cl.
    *B01D 69/02*     (2006.01)
    *B01D 69/10*     (2006.01)

(52) U.S. Cl.
    CPC ........... *B01D 69/02* (2013.01); *B01D 69/106* (2022.08); *B01D 2257/7027* (2013.01); *B01D 2323/08* (2013.01); *B01D 2323/12* (2013.01); *B01D 2325/022* (2013.01); *B01D 2325/04* (2013.01); *B01D 2325/12* (2013.01)

(56) References Cited

U.S. PATENT DOCUMENTS

| | | | |
|---|---|---|---|
| 9,227,891 | B2 | 1/2016 | Leflaive et al. |
| 9,873,094 | B2* | 1/2018 | Hong ................... B01D 71/701 |
| 2015/0290592 | A1* | 10/2015 | Dai ......................... B01D 71/28 96/14 |
| 2023/0001350 | A1* | 1/2023 | Dai ......................... B01D 71/32 |
| 2023/0321640 | A1* | 10/2023 | Yang ....................... C01B 39/40 502/4 |

FOREIGN PATENT DOCUMENTS

| | | |
|---|---|---|
| JP | WO2018/180210 A1 | 10/2018 |
| JP | 2019-509968 A | 4/2019 |
| KR | 10-2018-0079925 A | 7/2018 |

OTHER PUBLICATIONS

Alomair, Abdulaziz A., Sama M. Al-Jubouri, and Stuart M. Holmes. "A novel approach to fabricate zeolite membranes for pervaporation processes." *Journal of Materials Chemistry A* 3.18 (2015): 9799-9806.

Aroon, M. A., et al. "Performance studies of mixed matrix membranes for gas separation: A review." *Separation and purification Technology* 75.3 (2010): 229-242.

Baker, Richard W. "Future directions of membrane gas separation technology." *Industrial & engineering chemistry research* 41.6 (2002): 1393-1411.

Bernal, M. P., et al. "Separation of CO2/N2 mixtures using MFI-type zeolite membranes." *AIChE journal* 50.1 (2004): 127-135.

Bernardo, Paola, Enrico Drioli, and G. Golemme. "Membrane gas separation: a review/state of the art." *Industrial & engineering chemistry research* 48.10 (2009): 4638-4663.

Charcosset, Catherine. "Membrane processes in biotechnology: an overview." *Biotechnology advances* 24.5 (2006): 482-492.

Choi, Jungkyu, et al. "MFI zeolite membranes from a-and randomly oriented monolayers." *Adsorption* 12.5 (2006): 339-360.

Choi, Jungkyu, et al. "Grain boundary defect elimination in a zeolite membrane by rapid thermal processing." *Science* 325.5940 (2009): 590-593.

Cho, Hong Je, et al. "Renewable p-Xylene from 2, 5-Dimethylfuran and Ethylene Using Phosphorus-Containing Zeolite Catalysts." *ChemCatChem* 9.3 (2017): 398-402.

Gouzinis, Anastasios, and Michael Tsapatsis. "On the preferred orientation and microstructural manipulation of molecular sieve films prepared by secondary growth." *Chemistry of materials* 10.9 (1998): 2497-2504.

Groen, Johan C., Jacob A. Moulijn, and Javier Pérez-Ramírez. "Desilication: on the controlled generation of mesoporosity in MFI zeolites." *Journal of Materials Chemistry* 16.22 (2006): 2121-2131.

Gump, Christopher J., et al. "Aromatic permeation through crystalline molecular sieve membranes." *Industrial & engineering chemistry research* 40.2 (2001): 565-577.

Voß, Hartwig, et al. "Butene isomers separation on titania supported MFI membranes at conditions relevant for practice." *Journal of Membrane Science* 329.1-2 (2009): 11-17.

Hedlund, Jonas, et al. "High-flux MFI membranes." *Microporous and Mesoporous Materials* 52.3 (2002): 179-189.

Hedlund, Jonas, et al. "A masking technique for high quality MFI membranes." *Journal of Membrane Science* 222.1-2 (2003): 163-179.

Hedlund, Jonas, et al. "Permporometry analysis of zeolite membranes." *Journal of membrane science* 345.1-2 (2009): 276-287.

Hong, Sungwon, et al. "Healing of microdefects in SSZ-13 membranes via filling with dye molecules and its effect on dry and wet CO2 separations." *Chemistry of Materials* 30.10 (2018): 3346-3358.

Ismail, Ahmad Fauzi, and L. I. B. David. "A review on the latest development of carbon membranes for gas separation." *Journal of membrane science* 193.1 (2001): 1-18.

Jeon, Mi Young, et al. "Ultra-selective high-flux membranes from directly synthesized zeolite nanosheets." *Nature* 543.7647 (2017): 690-694.

Keizer, K., et al. "Two component permeation through thin zeolite MFI membranes." *Journal of membrane science* 147.2 (1998): 159-172.

Kim, Heejoong, et al. "On the synthesis of a hierarchically-structured ZSM-5 zeolite and the effect of its physicochemical properties with Cu impregnation on cold-start hydrocarbon trap performance." *Catalysis Today* 314 (2018): 78-93.

Korelskiy, Danil, et al. "Selective blocking of grain boundary defects in high-flux zeolite membranes by coking." *Journal of Materials Chemistry A* 5.16 (2017): 7295-7299.

Kosinov, Nikolay, et al. "High flux high-silica SSZ-13 membrane for CO 2 separation." *Journal of Materials Chemistry A* 2.32 (2014): 13083-13092.

Lee, Pyung-Soo, et al. "Sub-40 nm zeolite suspensions via disassembly of three-dimensionally ordered mesoporous-imprinted silicalite-1." *Journal of the American Chemical Society* 133.3 (2011): 493-502.

Lee, Taehee, Jungkyu Choi, and Michael Tsapatsis. "On the performance of c-oriented MFI zeolite Membranes treated by rapid thermal processing." *Journal of membrane science* 436 (2013): 79-89.

Lee, Minseong, et al. "Chabazite-type zeolite membranes for effective CO2 separation: the role of hydrophobicity and defect structure." *ACS applied materials & interfaces* 11.4 (2019): 3946-3960.

Li, Shiguang, John L. Falconer, and Richard D. Noble. "Improved SAPO-34 membranes for CO2/CH4 separations." *Advanced Materials* 18.19 (2006): 2601-2603.

Liu, Zheng, et al. "Transmission electron microscopy observation on fine structure of zeolite NaA membrane." *Chemistry of materials* 18.4 (2006): 922-927.

Milina, Maria, et al. "Mesopore quality determines the lifetime of hierarchically structured zeolite catalysts." *Nature Communications* 5.1 (2014): 1-10.

Morigami, Yoshio, et al. "The first large-scale pervaporation plant using tubular-type module with zeolite NaA membrane." *Separation and Purification Technology* 25.1-3 (2001): 251-260.

Möller, Karin, and Thomas Bein. "Pores within pores-how to craft ordered hierarchical zeolites." *Science* 333.6040 (2011): 297-298.

Na, Jindan, et al. "Synthesis and catalytic performance of ZSM-5/MCM-41 zeolites with varying mesopore size by surfactant-directed recrystallization." *Catalysis letters* 143.3 (2013): 267-275.

Nair, Sankar, et al. "Separation of close-boiling hydrocarbon mixtures by MFI and FAU membranes made by secondary growth." *Microporous and Mesoporous Materials* 48.1-3 (2001): 219-228.

Parra, J. B., et al. "Unraveling the argon adsorption processes in MFI-type zeolite." *The Journal of Physical Chemistry C* 112.27 (2008): 9976-9979.

Peng, Li, et al. "Fabrication of novel hierarchical ZSM-5 zeolite membranes with tunable mesopores for ultrafiltration." *Journal of Membrane Science* 549 (2018): 446-455.

Pérez-Ramírez, Javier, et al. "Hierarchical zeolites: enhanced utilisation of microporous crystals in catalysis by advances in materials design." *Chemical Society Reviews* 37.11 (2008): 2530-2542.

Pham, Tung Cao Thanh, Thanh Huu Nguyen, and Kyung Byung Yoon. "Gel-free secondary growth of uniformly oriented silica MFI zeolite films and application for xylene separation." *Angewandte Chemie* 125.33 (2013): 8855-8860.

(56) References Cited

OTHER PUBLICATIONS

Richter, Hannes, et al. "High-flux carbon molecular sieve membranes for gas separation." *Angewandte Chemie International Edition* 56.27 (2017): 7760-7763.
Ritter, James A., and Armin D. Ebner. "State-of-the-art adsorption and membrane separation processes for hydrogen production in the chemical and petrochemical industries." *Separation Science and Technology* 42.6 (2007): 1123-1193.
Hong, Sungwon, et al. "Quantitative elucidation of the elusive role of defects in polycrystalline MFI zeolite membranes on xylene separation performance." *Journal of Membrane Science* 569 (2019): 91-103.
Lai, Zhiping, et al. "Microstructural optimization of a zeolite membrane for organic vapor separation." *Science* 300.5618 (2003): 456-460.
Sanders, David F., et al. "Energy-efficient polymeric gas separation membranes for a sustainable future: A review." *Polymer* 54.18 (2013): 4729-4761.
Sandström, Linda, Erik Sjöberg, and Jonas Hedlund. "Very high flux MFI membrane for CO2 separation." *Journal of Membrane Science* 380.1-2 (2011): 232-240.
Franz, Schmidt, et al. "Coke location in microporous and hierarchical ZSM-5 and the impact on the MTH reaction." (2013): 238-245.
Sebastián, Víctor, et al. "Zeolite membrane for CO2 removal: Operating at high pressure." *Journal of Membrane Science* 292.1-2 (2007): 92-97.
Sokalski, Tomasz, et al. "Large improvement of the lower detection limit of ion-selective polymer membrane electrodes." *Journal of the American Chemical Society* 119.46 (1997): 11347-11348.
Strathmann, Heiner. "Membrane separation processes: current relevance and future opportunities." *AIChE journal* 47.5 (2001): 1077-1087.
Tomita, Toshihiro, Kunio Nakayama, and Hitoshi Sakai. "Gas separation characteristics of DDR type zeolite membrane." *Microporous and Mesoporous Materials* 68.1-3 (2004): 71-75.
Van Laak, Adri NC, et al. "Mesoporous mordenites obtained by sequential acid and alkaline treatments—Catalysts for cumene production with enhanced accessibility." *Journal of Catalysis* 276.1 (2010): 170-180.
Van Reis, Robert, and Andrew Zydney. "Membrane separations in biotechnology." *Current Opinion in Biotechnology* 12.2 (2001): 208-211.
Varoon, Kumar, et al. "Dispersible exfoliated zeolite nanosheets and their application as a selective membrane." *Science* 334.6052 (2011): 72-75.
Verboekend, Danny, and Javier Pérez-Ramírez. "Design of hierarchical zeolite catalysts by desilication." *Catalysis Science & Technology* 1.6 (2011): 879-890.
Wang, Yun, et al. "A review of polymer electrolyte membrane fuel cells: Technology, applications, and needs on fundamental research." *Applied energy* 88.4 (2011): 981-1007.
Wu, Leilei, et al. "Dual template synthesis of a highly mesoporous SSZ-13 zeolite with improved stability in the methanol-to-olefins reaction." *Chemical communications* 48.76 (2012): 9492-9494.
Xomeritakis, George, Sankar Nair, and Michael Tsapatsis. "Transport properties of alumina-supported MFI membranes made by secondary (seeded) growth." *Microporous and Mesoporous Materials* 38.1 (2000): 61-73.
Xomeritakis, George, Zhiping Lai, and Michael Tsapatsis. "Separation of xylene isomer vapors with oriented MFI membranes made by seeded growth." *Industrial & engineering chemistry research* 40.2 (2001): 544-552.
Xu, Dandan, et al. "On the synthesis and adsorption properties of single-unit-cell hierarchical zeolites made by rotational intergrowths." *Advanced Functional Materials* 24.2 (2014): 201-208.
Yoo, Won Cheol, et al. "High-performance randomly oriented zeolite membranes using brittle seeds and rapid thermal processing." *Angewandte Chemie International Edition* 49.46 (2010): 8699-8703.
Zhang, Baoquan, et al. "Selective defect-patching of zeolite membranes using chemical liquid deposition at organic/aqueous interfaces." *Advanced Functional Materials* 18.21 (2008): 3434-3443.
Atabani, Sowsan F., et al. "Natural measles causes prolonged suppression of interleukin-12 production." *The Journal of infectious diseases* 184.1 (2001): 1-9.
Japanese Office Action issued on May 19, 2023, in counterpart Japanese Patent Application No. 2022-519052 (5 pages in English, 4 pages in Japanese).
Shen, Kui, et al. "Seed-induced and additive-free synthesis of oriented nanorod-assembled meso/macroporous zeolites: toward efficient and cost-effective catalysts for the MTA reaction." *Catalysis Science & Technology* 2017, 7(Oct. 2, 2017): pp. 5143-5153.
Wang, Xuerui, et al. "One-pot synthesis of high-flux b-oriented MFI zeolite membranes for Xe recovery." *ACS applied materials & interfaces* 2018, 10.39 (Sep. 9, 2018): pp. 33574-33580.
Jia, Xicheng, et al. "Modern synthesis strategies for hierarchical zeolites: Bottom-up versus top-down strategies." *Advanced Powder Technology* 30.3 (2019) (Dec. 28, 2018): pp. 467-484.
Bai, Risheng, et al. "Creating hierarchical pores in zeolite catalysts." *Trends in Chemistry* vol. 1, No. 6 (Jul. 24, 2019): pp. 601-611.
Korean Office Action issued on Dec. 3, 2020 in corresponding Korean Patent Application No. 10-2019-0118060 (7 pages in Korean).

\* cited by examiner

SEPARATOR MEMBRANE HAVING HIERARCHICAL STRUCTURE COMPRISING MESOPORES, PRODUCTION METHOD THEREFOR AND XYLENE SEPARATION METHOD USING SAME

CROSS REFERENCE TO RELATED APPLICATIONS

This application is a U.S. National Stage Application of International Application No. PCT/KR2020/013000, filed on Sep. 24, 2020, which claims the benefit under 35 USC 119(a) and 365(b) of Korean Patent Application No. 10-2019-0118060, filed on Sep. 25, 2019 in the Korean Intellectual Property Office, the entire disclosure of which is incorporated herein by reference for all purposes.

TECHNICAL FIELD

The present invention relates to a hierarchically structured membrane having mesopores therein, a method of preparing the same, and a method of separating xylene using the same, and more particularly to a hierarchically structured membrane having mesopores therein, which exhibits a small thickness, reduced incidence of defects, and high xylene permeation separation performance due to the introduction of mesopores into a microporous zeolite membrane, a method of preparing the same, and a method of separating xylene using the same.

BACKGROUND ART

A membrane-based separation process is new technology that is receiving attention due to the many advantages thereof over distillation, adsorption, and crystallization. In particular, the membrane process is energy-efficient, simple, and space-efficient (D. E. Sanders et al., Polymer 54, 4729-4761 (2013); H. Strathmann, AIChE J. 47, 1077-1087 (2001); V. Sebastian et al., J. Membr. Sci. 292, 92-97 (2007)). Due to these advantages, researchers in various fields such as petrochemical, fabrication and biotechnical fields are adopting membrane-based separation (H. Strathmann, AIChE J. 47, 1077-1087 (2001); M. A. Aroon et al., A Review. Sep. Purif. Technol. 75, 229-242 (2010); C. Charcosset, An Overview. Biotechnol. Adv. 24, 482-492 (2006); M. T. Ravanchi et al., A Review. Desalination 235, 199-244 (2009); J. A. Ritter et al., Sep. Sci. Technol. 42, 1123-1193 (2007); R. van Reis et al., Curr. Opin. Biotechnol. 12, 208-211 (2001)). Indeed, many membranes made of polymers (T. Sokalski et al., J. Am. Chem. Soc. 119, 11347-11348 (1997); Y. Wang et al., Appl. Energy 88, 981-1007 (2011)), carbon (A. F. Ismail et al., J. Membr. Sci. 193, 1-18 (2001); H. Richter et al., Angew. Chem. Int. Ed. 56, 7760-7763 (2017)), and zeolite (Z. P. Lai et al., Science 300, 456-460 (2003); Y. Morigami et al., Sep. Purif. Technol. 25, 251-260 (2001)) have been proven to be effective for separation. Among these, zeolite is able to act as an effective sieve capable of recognizing minute size/shape differences at the molecular level under harsh conditions, and these properties make zeolite membranes suitable for various industrial processes (V. Sebastian et al., J. Membr. Sci. 292, 92-97 (2007); R. W. Baker, Eng. Chem. Res. 41, 1393-1411 (2002)). For example, zeolite membranes show good performance for separation of industrially and environmentally important mixtures such as p-lo-xylene (J. Choi et al., Science 325, 590-593 (2009); M. Y. Jeon et al., Nature 543, 690-694 (2017)), 1-butene/isobutene (H. Richter et al., Angew. Chem. Int. Ed. 56, 7760-7763 (2017); H. Voss et al., J. Membr. Sci. 329, 11-17 (2009)), ethanol/water (Y. Morigami et al., J. Mater. Chem. A 3, 9799-9806 (2015)), $CO_2/N_2$ (M. P. Bernal et al., AIChE J. 50, 127-135 (2004); N. Kosinov et al., J. Mater. Chem. A 2, 13083-13092 (2014)), and $CO_2/CH_4$ (T. Tomita et al., Microporous Mesoporous Mater. 68, 71-75 (2004); S. G. Li et al., Adv. Mater. 18, 2601-2603 (2006)). When zeolite having a pore size and structure suitable for a material to be separated is selected, it is possible to manufacture a molecular sieve membrane that separates the mixture according to the size. For example, an MFI-structured zeolite membrane having a pore size of 0.55 nm is capable of separating, based on size, a mixture of p-xylene (0.58 nm) and o-xylene (0.68 nm), which have similar boiling points and are thus difficult to separate using a conventional separation process.

A molecular sieve membrane manufactured using zeolite having micropores (having a pore size of about 2 nm) shows very high separation performance because it is possible to separate mixtures based on size. However, since the pore size of zeolite is similar to the size of molecules passing through the membrane, the zeolite membrane has low permeance. When membrane technology is applied to a membrane process, the use of a membrane having low permeance requires a large number of membranes. This disadvantage causes a great difficulty in practical application of zeolite membranes despite the high separation capability.

In this way, the zeolite membrane has several limitations that interfere with the practical use thereof. Moreover, membrane-based separation devices have to be constructed so as to complement and add to conventional separation systems. Indeed, high permeance of molecules across the zeolite membrane is very important to achieve economic efficiency, which is related to the space intensiveness of membranes and, consequently, to installation costs (P. Bernardo et al., Ind. Eng. Chem. Res. 48, 4638-4663 (2009); L. Sandstrom et al., J. Membr. Sci. 380, 232-240 (2011)). Many studies aim to improve permeance of target molecules, and mainly focus on reducing the thickness of the membrane (M. Y. Jeon et al., Nature 543, 690-694 (2017); W. C. Yoo et al., Angew. Chem. Int. Ed. 49, 8699-8703 (2010); J. Hedlund et al., J. Membr. Sci. 222, 163-179 (2003); T. C. T. Pham et al., Angew. Chem. Int. Ed. 52, 8693-8698 (2013)). Recently, a 250-1000 nm thin MFI membrane has been manufactured through secondary growth of a seed layer made of extremely thin nanosheets (M. Y. Jeon et al., Nature 543, 690-694 (2017)). Several approaches have realized very thin membranes capable of shortening the effective diffusion length of MFI-type membranes (M. Y. Jeon et al., Nature 543, 690-694 (2017); W. C. Yoo et al., Angew. Chem. Int. Ed. 49, 8699-8703 (2010); J. Hedlund et al., J. Membr. Sci. 222, 163-179 (2003); T. C. T. Pham et al., Angew. Chem. Int. Ed. 52, 8693-8698 (2013); K. Varoon et al., Science 334, 72-75 (2011)). However, there is the inevitability that a thin membrane will have deteriorated mechanical properties and be vulnerable to external impact. Moreover, in the case in which nanosheets are not used as seeds (M. Y. Jeon et al., Nature 543, 690-694 (2017)), it is difficult to fill the gaps between deposited seeds (C. Algieri et al., J. Membr. Sci. 222, 181-190 (2003)). Therefore, it is quite difficult to avoid the formation of defects when synthesizing a continuous thin zeolite membrane. Although expected in small amounts, defects provide a non-selective pathway for permeating molecules (J. Hedlund et al., J. Membr. Sci. 345, 276-287 (2009); S. Hong et al., Chem. Mater. 30, 3346-3358 (2018); S. Hong et al., J. Membr. Sci. 569, 91-103 (2019)). Although several approaches to reduce the incidence of defects have been reported (S. Hong et al., Chem. Mater. 30, 3346-3358 (2018); B. Q. Zhang et al., Adv. Funct. Mater. 18, 3434-3443 (2008); D. Korelskiy et al., J. Mater. Chem. A 5, 7295-7299 (2017)), reliable methods for the manufacture of membranes maintaining the inherent high performance of zeolite are still in the development stage.

Accordingly, the present inventors have made great efforts to solve the above problems, and ascertained that, when manufacturing a hierarchically structured zeolite membrane by introducing mesopores having a size of 2 to 20 nm into a conventional microporous zeolite membrane, the defect density is greatly reduced, and simultaneously, it is possible to obtain a high molar flux of p-xylene, thus exhibiting high p-lo-xylene separation performance without thermal degradation even under conditions of a temperature of 200° C. or higher and a feed gas containing 8 kPa of p-xylene, thereby culminating in the present invention.

SUMMARY OF THE INVENTION

It is an objective of the present invention to provide a membrane having a greatly reduced defect density and high p-lo-xylene separation performance without thermal degradation compared to a conventional zeolite membrane, and a method of manufacturing the same.

It is another objective of the present invention to provide a method of separating xylene using the membrane.

In order to accomplish the above objectives, the present invention provides a hierarchically structured zeolite membrane having a thickness of 0.1 to 5 μm and including micropores having a size of 2 nm or less and mesopores having a size of 2 to 20 nm.

In addition, the present invention provides a method of preparing the hierarchically structured zeolite membrane including adding a secondary growth solution including a tetraalkylphosphonium salt, $SiO_2$, and $H_2O$ at a molar ratio of 5-50:5-500:1,000-50,000 onto a support on which an MFI seed layer is formed and performing hydrothermal synthesis.

In addition, the present invention provides a method of separating p-xylene including separating p-xylene from a xylene-containing mixture using the hierarchically structured zeolite membrane.

DETAILED DESCRIPTION OF THE INVENTION

Figure 1:
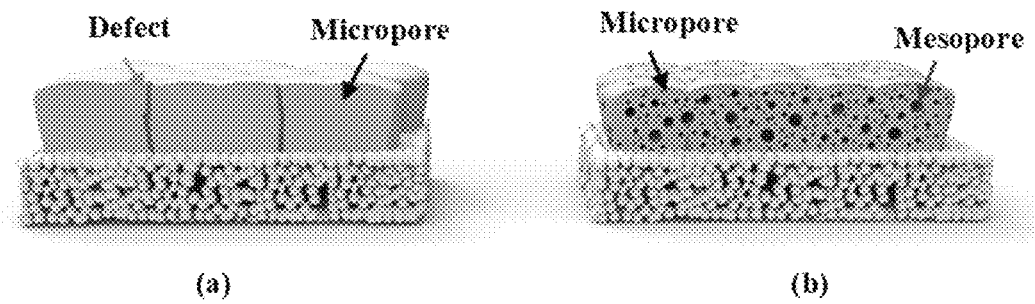
FIG. 1 schematically shows (a) a cross section of a conventional MFI membrane and (b) a cross section of a hierarchically structured membrane according to an embodiment of the present invention.

Unless otherwise defined, all technical and scientific terms used herein have the same meanings as those typically understood by those skilled in the art to which the present invention belongs. In general, the nomenclature used herein is well known in the art and is typical.

When manufacturing a hierarchically structured zeolite membrane by introducing mesopores having a size of 2 to 20 nm into a conventional microporous zeolite membrane, the defect density may be greatly reduced, and simultaneously, a high molar flux of p-xylene may be obtained, indicating high p-lo-xylene separation performance without thermal degradation even at a temperature of 200° C. or higher.

Accordingly, an aspect of the present invention pertains to a hierarchically structured zeolite membrane having a thickness of 0.1 to 5 μm and including micropores having a size of 2 nm or less and mesopores having a size of 2 to 20 nm.

Another aspect of the present invention pertains to a method of preparing the hierarchically structured zeolite membrane including adding a secondary growth solution including a tetraalkylphosphonium salt, $SiO_2$, and $H_2O$ at a molar ratio of 5-50:5-500:1,000-50,000 onto a support on which an MFI seed layer is formed and performing hydrothermal synthesis.

Hereinafter, a detailed description will be given of the present invention. Since a very thin membrane is sensitive even to a small number of defects, the present invention is directed to creating a hierarchical structure by inserting mesopores into a conventional zeolite membrane. When mesopores are present inside a zeolite membrane, like the pores in Swiss cheese, the mesopores are able to act as a fast transport pathway in the microporous zeolite particles (D. D. Xu et al., Adv. Funct. Mater. 24, 201-208 (2014)). Hierarchically structured catalysts have been widely used in catalytic research because high performance is obtained by overcoming the diffusion limit of general microporous catalysts and preventing catalyst deactivation (F. Schmidt et al., J. Catal. 307, 238-245 (2013); J. Perez-Ramirez et al., Chem. Soc. Rev. 37, 2530-2542 (2008)). There are two main approaches to the preparation of hierarchically structured catalysts; a top-down manner via desilication/dealumination (D. Verboekend et al., Catal. Sci. Technol. 1, 879-890 (2011); J. C. Groen et al., J. Mater. Chem. 16, 2121-2131 (2006); A. N. C. van Laak et al., J. Catal. 276, 170-180 (2010)) and a bottom-up manner through selection of an appropriate structure-directing agent (SDA) (K. Na et al., Science 333, 328-332 (2011); X. Y. Zhang et al., Science 336, 1684-1687 (2012)). Of these two methods, the former method is referred to as a post-mesopore-generation method (a top-down approach capable of causing simultaneous generation of the aforementioned non-selective defects). However, SDA is expensive, and thus the use thereof has to be minimized. A commercially available organic template (tetra-n-butylphosphonium hydroxide; TBPOH) has been reported to be effective for preparing jungle-gym-like SPPs (self-pillared pentasils) (D. D. Xu et al., Adv. Funct. Mater. 24, 201-208 (2014); X. Y. Zhang et al., Science 336, 1684-1687 (2012)). Technically, SPP is formed through repeated branching of MFI zeolite around a MEL-type zeolite core. It has been reported that a synthesis route for the preparation of hierarchically structured zeolite particles was actually used as means for manufacturing a zeolite membrane. Specifically, an organosilane surfactant, namely 3-[(trimethoxysilyl)propyl]octyldimethyl-ammonium chloride (TPOAC), was used. Although the resulting MFI-type zeolite membrane had no permselectivity for small molecules, improved water permeance was obtained with an increase in the number of mesopores (L. Peng et al., J. Membr. Sci. 549, 446-455 (2018).

In the present invention, the use of TBPOH as SDA may be made possible by inducing the formation of a microporous zeolite membrane having mesopores therein through TBPOH, which allows the formation of meso-microporous particles, like the jungle gym mentioned above. The actually synthesized zeolite membrane contains mesopores therein, and thus resembles Swiss cheese. Given the same thickness as a conventional zeolite membrane, the membrane of the present invention has higher p-xylene molar permeance, indicating a substantial decrease in diffusion length. Preferably, the membrane having mesopores therein has few defects, and thus exhibits high p-xylene permeation separation performance (especially at a high temperature of 200° C. or more). In particular, this high-temperature separation capability is well maintained, making the hierarchically structured membrane suitable for refining and petrochemical industries (U.S. Pat. Nos. 6,376,733; 9,227,891; 6,646,177). In particular, it is suitable for supplementing the conventional adsorption-based separation process. The presence of the mesopores distributed inside the membrane helps to maintain high performance over a long operating period.

In the present invention, the tetraalkylphosphonium salt may be at least one selected from the group consisting of TBPOH, TBPF, TBPBr, TBPCl, TBPI, TPPOH, TPPF, TPPBr, TPPCl, TPPI, TEPOH, TEPF, TEPBr, TEPCl, and TEPI, but is not limited thereto.

Preferably, TBPOH is used in Examples, and TBPF, TBPBr, TBPCl, or TBPI, resulting from substituting OH of TBPOH with a halogen atom, is used. Also, a compound such as tetrapropyl phosphonium (TPP) or tetraethyl phosphonium (TEP) may be used instead of tetrabutyl phosphonium (TBP).

In the present invention, hydrothermal synthesis may be performed at a temperature of 70 to 175° C. for 12 to 240 hours, preferably at a temperature of 90 to 140° C. for 24 to 240 hours. When hydrothermal synthesis is carried out in the above temperature and time ranges, a thin and uniform membrane having mesopores therein and having a thickness of 0.1 to 5 μm may be effectively synthesized.

In the present invention, hydrothermal synthesis may be performed once or twice, but the present invention is not limited thereto.

In the present invention, after hydrothermal synthesis, the method may further include drying the membrane at a temperature of 30 to 200° C. for 1 to 24 hours, preferably at a temperature of 50 to 100° C. for 5 to 12 hours.

In the present invention, the method may further include removing the remaining organic structure-directing agent from the membrane by calcining the membrane for 6 to 48 hours at 350 to 650° C. at a temperature elevation rate of 0.2 to 10° C.·min$^{-1}$ in the presence of air flowing at 10 to 1,000 mL·min$^{-1}$, after drying the membrane.

In the present invention, the support may be at least one selected from the group consisting of alumina, polypropylene, polyethylene, polytetrafluoroethylene, polysulfone, polyimide, silica, glass gamma-alumina, mullite, zirconia, titania, yttria, ceria, vanadia, silicon, stainless steel, and carbon, but is not limited thereto.

Based on the results of measurement of separation performance of a mixture of p-xylene and o-xylene using the hierarchically structured membrane in an embodiment of the present invention, a p-xylene permeance of 1.6 mol·s$^{-1}$·Pa$^{-1}$ at 225° C. and a separation factor of 53.8 were obtained. Compared to a conventional membrane having the same thickness, the p-xylene permeance is 2 times as high and the separation factor is 15 times as high. Moreover, based on the test results of process stability under high temperature conditions (275° C.) for about 200 hours, the separation factor was maintained constant, and the permeance decreased by 20 to 25%. For a conventional membrane having the same thickness, it was confirmed that the permeance decreased by 50 to 55%.

Accordingly, still another aspect of the present invention pertains to a method of separating p-xylene including separating p-xylene from a mixture of aromatic hydrocarbons including xylene isomers using the hierarchically structured zeolite membrane.

The pore size of zeolite according to the present invention is 0.55 nm, which is similar to p-xylene (0.58 nm) and is smaller than o-xylene (0.68 nm). Therefore, the use of the membrane enables separation of a mixture of xylene isomers based on size. The hierarchically structured membrane is capable of exhibiting higher permeance due to the mesopores in the structure and higher process stability.

As described above, the hierarchically structured zeolite membrane according to the present invention enables rapid transport of a target molecule, namely a p-xylene molecule, by virtue of the mesopores embedded in the membrane, and also prevents deterioration in membrane performance, thereby exhibiting high flux and selectivity. In particular, a much higher p-xylene molar flux and p-lo-xylene selectivity may be manifested even at high temperatures.

The method of separating xylene according to the present invention may be performed at a temperature of 200° C. or higher, preferably at a temperature of 200 to 300° C.

In the use of the hierarchically structured zeolite membrane according to the present invention, the separation of carbon dioxide includes all of the separation, capture, and removal of carbon dioxide.

A better understanding of the present invention may be obtained through the following examples. These examples are merely set forth to illustrate the present invention, and are not to be construed as limiting the scope of the present invention, as will be apparent to those skilled in the art.

EXAMPLES

Preparation Example 1: Synthesis of Hierarchically Structured Zeolite Membrane

A zeolite membrane was manufactured using a seeded growth method. Spherical MFI particles having a size of 100 nm are used as nuclei or seed particles in the manufacture of conventional and hierarchically structured membranes. A synthesis method using spherical MFI particles has previously been reported (J. Choi et al., Adsorption 12, 339-360 (2006)). In order to prepare a densely spread seed layer, MFI particles were deposited on a disc-shaped $\alpha$-$Al_2O_3$ support using a sonicator (UC-10P, JEIO TECH) (diameter: 21 mm, thickness: 2 mm) (J. Choi et al., Adsorption 12, 339-360 (2006)). Specifically, a homemade $\alpha$-$Al_2O_3$ disc was fixed to a Teflon holder, and then sandwiched with a disc-shaped cover glass (22 mm in diameter (Fisher Scientific, no. 22CIR-1)). The sandwiched disc was immersed in a preprepared MFI seed suspension (0.05 g of 100 nm-sized MFI particles/40 mL of anhydrous toluene (Sigma Aldrich)) and sonication was then performed for 20 minutes. After formation of the seed layer through sonication, the temperature was raised to 450° C. at a temperature elevation rate of 1° C.·$min^{-1}$, followed by calcination at the raised temperature for 4 hours. For a detailed description of the process of forming the seed layer, reference may be made to J. Choi et al. (Adsorption 12, 339-360 (2006)).

For synthesis of a conventional MFI membrane (used as a reference in this example), tetrapropylammonium hydroxide (TPAOH, 1.0 M in $H_2O$, Sigma Aldrich) was used as SDA. Tetraethyl orthosilicate (TEOS, reagent grade, Sigma Aldrich) was used as a silica source. Specifically, TPAOH was placed in a polypropylene (pp) bottle containing distilled water, and TEOS was then added thereto. The synthesis sol thus prepared was hydrolyzed overnight using a shaking machine (SI-300R, Lab Companion, South Korea) after tightly sealing the pp bottle. The final composition of the synthesis sol for a conventional MFI membrane was 40 $SiO_2$ to 9 TPAOH to 9500 $H_2O$ to 160 ethanol. For a detailed description for preparation of the synthesis sol, reference may be made to the literature (J. Choi et al., Adsorption 12, 339-360 (2006); A. Gouzinis et al., Chem. Mater. 10, 2497-2504 (1998)).

For the method of synthesizing a hierarchically structured membrane, reference may be made to the literature (X. Y. Zhang et al., Science 336, 1684-1687 (2012)), the only difference being the amount of water. Specifically, TBPOH (40 wt % in $H_2O$, Sigma Aldrich) was added dropwise to TEOS while stirring. Thereafter, distilled water was added to the mixed solution and then stirred in a beaker for 12 hours. Here, the beaker was sealed with a parafilm. Subsequently, ethanol formed during hydrolysis of TEOS was removed through evaporation with stirring at room temperature. The final composition of the synthesis solution was 40 $SiO_2$ to 12 TBPOH to 10000 $H_2O$.

For a hydrothermal reaction, the $\alpha$-$Al_2O_3$ disc on which the seed layer was formed was completely immersed in a Teflon liner containing each of the two synthesis solutions mentioned above. Then, the sealed Teflon liner was placed in an autoclave, which was then placed in a preheated convection oven. As previously reported, a conventional membrane was allowed to react at 90° C. for 5 days (G. Xomeritakis et al., Ind. Eng. Chem. Res. 40, 544-552 (2001)). The hierarchically structured membrane was allowed to react at 115° C. for 4 days. After completion of the first hydrothermal synthesis reaction, the membrane was immersed in distilled water overnight and then dried at room temperature for 12 hours. Thereafter, the dried membrane was placed in a Teflon liner containing new synthesis sol and then allowed to react at 115° C. for an additional 6 days. After hydrothermal synthesis, the membrane was immersed in distilled water overnight and then dried at 100° C. for 12 hours. The two types of dried membranes were heated to 480° C. at a temperature elevation rate of 0.5° C.·$min^{-1}$, followed by calcination at the elevated temperature for 10 hours. Here, normal air was allowed to flow at 200 mL·$min^{-1}$. Through this procedure, SDA was removed from the zeolite structure. The two membranes thus manufactured were named MM and HM, respectively. Here, the first letter M and H denote a conventional microporous MFI membrane and a hierarchically structured membrane, respectively, and the second letter M denotes a membrane. In addition, when the two membranes were manufactured, the particles formed in the synthesis sol were collected, centrifuged 5 times, and dried at 70° C. Subsequently, the recovered particles were heated to 550° C. at a temperature elevation rate of 1° C.·$min^{-1}$ in the presence of air flowing at 200 mL·$min^{-1}$, followed by calcination at the elevated temperature for 10 hours. Respective particles were named MM and HM particles.

Example 1: Analysis of Properties of Hierarchically Structured Membrane

X-ray diffraction (XRD) patterns were obtained using a Rigaku D/Max-2500V/PC diffractometer. Scanning electron microscopy (SEM, Hitachi SU-70, S-4300, and S-4800) was used to obtain images of the zeolite samples. Energy dispersive X-ray spectroscopy (EDX) was performed using a Hitachi S-4800 SEM. The Ar adsorption isotherms of the samples were measured at 87 K (3Flex Physisorption, Micromeritics Instrument Corp.). In particular, the membrane sample was measured after breaking the same into small pieces. Before measurement, both the membrane sample and the particle sample were degassed in a vacuum at 350° C. for 12 hours. Regarding the pore size distribution, Horvath-Kawazoe (H-K) and Barrett-Joyner-Halenda (BJH) analysis methods were used to obtain the properties of micropores and mesopores, respectively. Confocal optical microscope (FCOM) images showing defects in the membrane samples were obtained using an LSM 700 laser-scanning confocal microscope (Zeiss). Before FOCM measurement, the membrane sample was dyed with a fluorescein $Na^+$ salt (Sigma-Aldrich) aqueous solution, and the procedure therefor has been previously reported (S. Hong et al., J. Membr. Sci. 569, 91-103 (2019)). Since the dye molecule has a size of 1 nm, selective contact thereof with the defects in the membrane becomes possible, from which the amount and location of the defects were confirmed through FCOM images. Field emission transmission electron microscopy (TEM) images were obtained using Tecnai G² F30ST (FEI company). In order to confirm the grain structure of the HM membrane, grains were obtained in a small amount by scraping the membrane sample using sharp tweezers.

In addition, for better visualization of the cross section of the HM membrane, 5×2 µm² sized pieces having a thickness of 100 nm were obtained using an LYRA3 XMH dual-beam focused ion beam (TESCAN). These samples were placed on a TEM grid (Omniprobe® Lift-Out Grids (Cu), Ted Pella, Inc.) and analyzed (Tecnai G² F30ST). FT-IR (Fourier transform infrared spectroscopy, Nicolet iS50, Thermo Fisher Scientific Inc.) was used to analyze acid sites of the MM and HM membranes. To this end, pyridine (J. D. Na et al., Catal. Lett. 143, 267-275 (2013)), capable of titrating the Bronsted and Lewis acid sites, was used as a probe molecule. In particular, the membrane sample was heated to 300° C. at 3° C.·min$^{-1}$ in a vacuum and then thermally activated at the elevated temperature for 6 hours. After thermal activation, FT-IR spectra of the fresh membrane sample were measured in ATR (attenuated total reflection) mode and then used as a reference. Also, the upper surface of the membrane was immersed in pyridine for 10 minutes. Thereafter, the sample containing pyridine was dried at room temperature for 10 minutes before FT-IR measurement. This process is performed to remove pyridine that is physically or weakly attached to the membrane sample. The FT-IR spectrum of the membrane sample in which pyridine is adsorbed to the acid sites was measured at 15-minute intervals in ATR mode.

Figure 2:
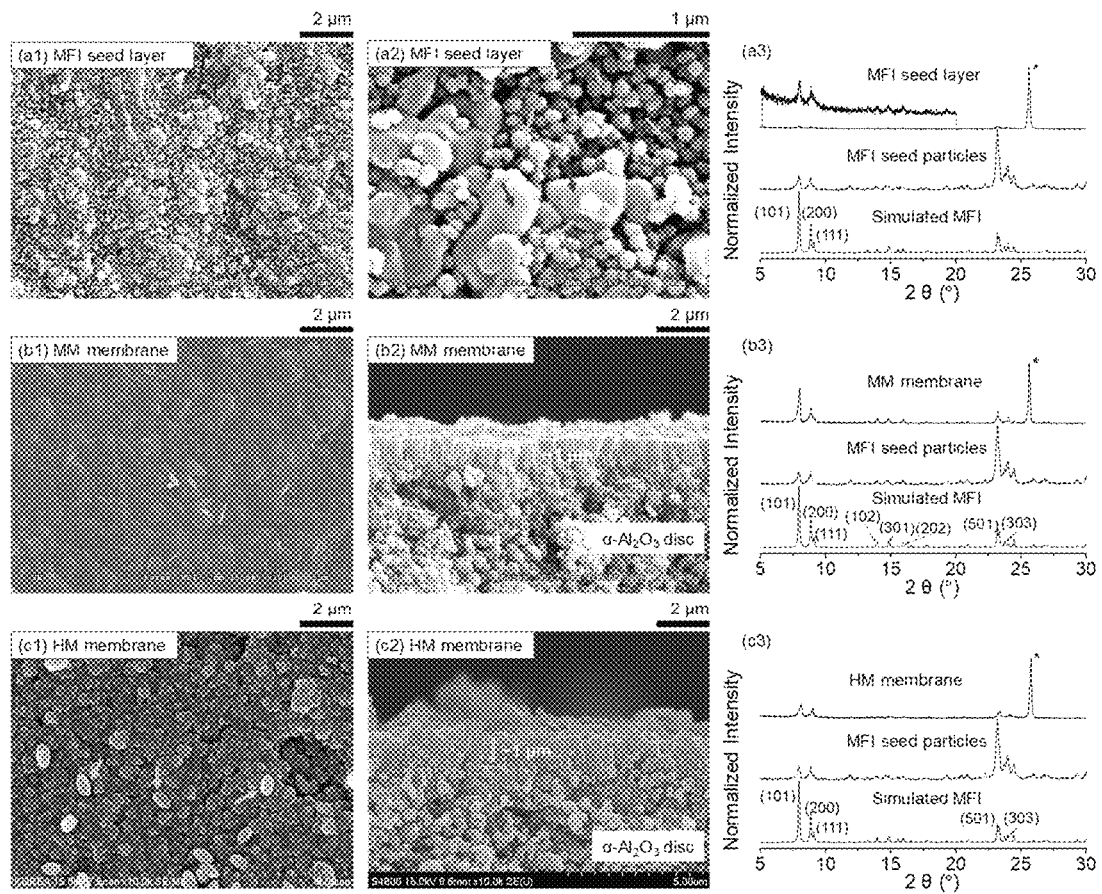
FIG. 2 shows SEM images and XRD graphs of seed layers and membranes according to an embodiment of the present invention.
Figure 3:
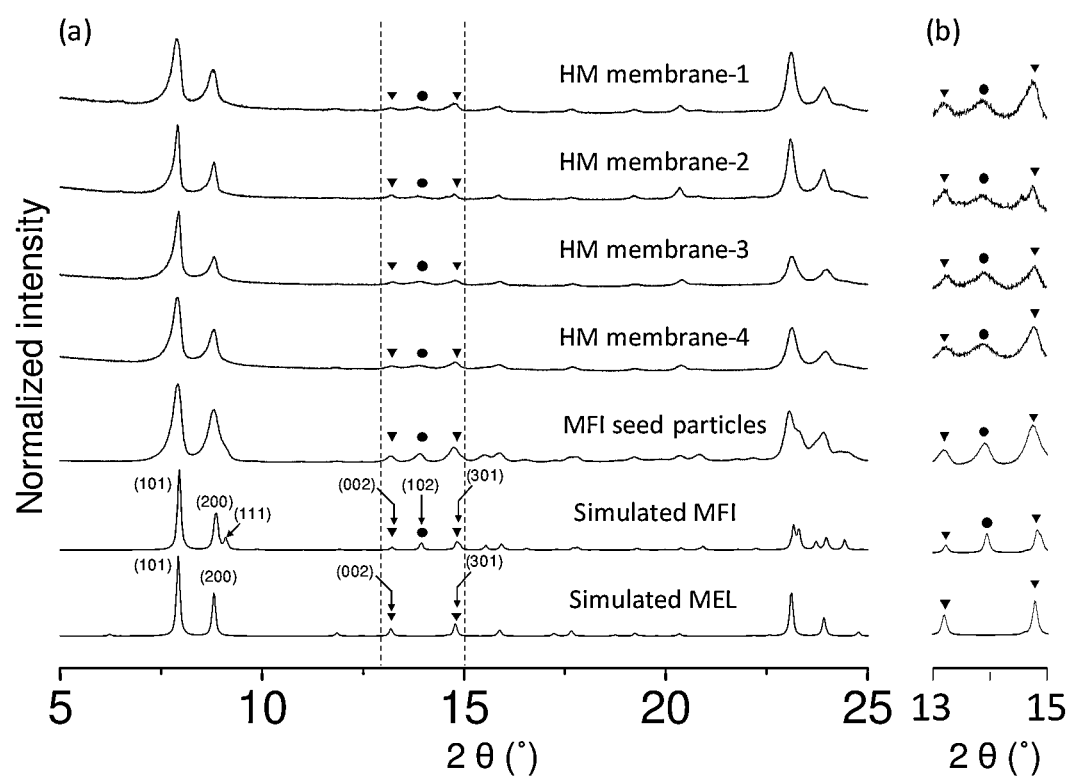
FIG. 3 shows XRD graphs of MFI particles and four HM membranes according to an embodiment of the present invention.
Figure 9:
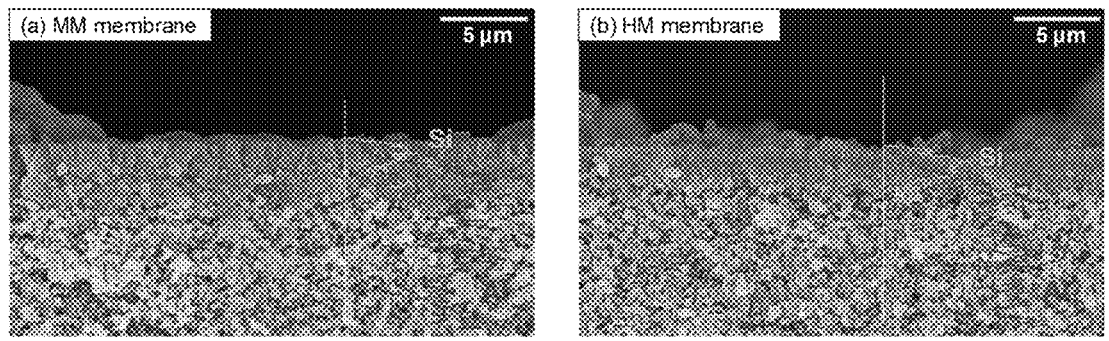
FIG. 9 is images showing the EDX measurement results of the MM membrane and the HM membrane according to an embodiment of the present invention.

In Examples, an MM membrane was synthesized in order to compare the properties and performance with those of the HM membrane. Despite using the same seed layer ((a1)-(a2) in FIG. 2) compacted with spherical MFI-type zeolite particles having a size of 100 nm, MM (FIG. 2(b1)) and HM (FIG. 2(c1)) respectively synthesized using TPAOH and TBPOH showed different morphologies upon SEM analysis. First, the MM membrane had a smooth membrane surface, as reported in the literature (G. Xomeritakis et al., Ind. Eng. Chem. Res. 40, 544-552 (2001)). In contrast, the HM membrane had a rough membrane surface, which appears to be due to non-uniform grains. Such non-uniform grains are associated with self-pillaring crystal growth in which MFI zeolites are repeatedly branched around MEL zeolite (X. Y. Zhang et al., Science 336, 1684-1687 (2012)). Individual grains appear to be composed of smaller particles. In the HM membrane, elliptical particles, indicated by orange arrows in FIGS. 2(c1) and 8(a), were found. These elliptical particles are similar in shape and size to the HM particles obtained from the synthesis solution used for the secondary growth. These particles appear to nucleate and grow during hydrothermal synthesis of the HM membrane, and then to attach to the surface of the membrane. Based on the results of analysis of the XRD patterns of the two membranes, it was confirmed that the MM membrane was made of pure MFI-type zeolite, but that the HM membrane contained some MEL structure in addition to the MFI-type zeolite (FIGS. 2(b3)-(c3)). In particular, it was confirmed through XRD analysis that about 12% of the MEL structure was contained in the HM membrane (FIG. 3), which is associated with the self-pillaring crystal growth described above. The thickness of both membranes was observed to be 1 µm (FIGS. 2(b2)-(c2)), so the permeation results were considered to be directly related to structural differences. The cross-sectional SEM image of the HM membrane of FIG. 2(c2) shows coarse grains of the HM membrane, whereas the MM membrane shows smooth grains (FIG. 9). Despite the similar membrane thicknesses, the XRD analysis result of FIG. 2(b3) shows that the MM membrane has h0h-orientation, whereas the HM membrane has no orientation (FIG. 2(c3)). Therefore, the improved separation performance due to orientation can be observed only in the MM membrane.

Hierarchical Structure of HM Membrane

Figure 4:
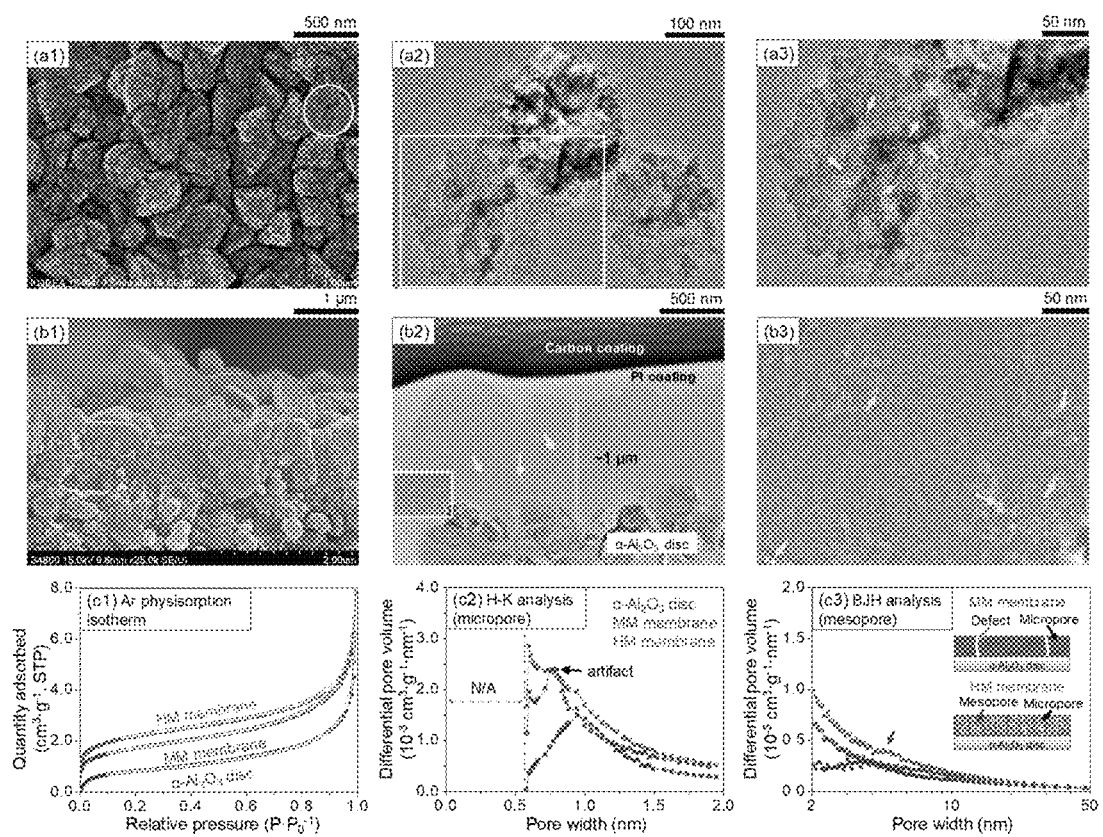
FIG. 4 shows TEM images, Ar adsorption isotherm measurement graphs, and BJH and H-K analysis results for understanding the hierarchical structure of the HM membrane according to an embodiment of the present invention.

In order to understand the properties of the HM membrane, grains on the surface of the membrane were sampled (FIG. 4(a1)) and analyzed through TEM. The TEM image results at high magnifications (FIGS. 4(a2)-(a3)) show that irregular grains are formed due to the growth of small particles with a rough surface, and show clearly that they contain spherical mesopores, indicated by yellow arrows in FIG. 4(a3). The size of the mesopores is 2-5 nm. For comparison, the particle TEM image of FIG. 4(a3) was shown at the same scale in the white circle in FIG. 4(a1). Through direct comparison, the particles used for TEM analysis (FIGS. 4(a2)-(a3)) were very similar to the grains of the HM membrane, indicating that the particle sample obtained from the membrane sample was representative of the grains of the membrane. In addition to grain analysis, microstructure characteristics were analyzed while the cross section of the HM membrane was observed. In particular, the rough surface observed in FIG. 4(a1) is also present in the cross-sectional SEM image (FIG. 4(b1)).

More importantly, the TEM image of FIG. 4(b2) shows that white dots or cavities, some of which are indicated by yellow arrows, exist in the middle of the membrane. The TEM image at a high magnification confirms the presence of the cavity (FIG. 4(b3)). As is apparent from the cross-sectional TEM image, these forms appear to be mesopores having a size of about 2-5 nm (Z. Liu et al., Chem. Mater. 18, 922-927 (2006)). In particular, the white dots within the grains in FIG. 4(a3) have comparable pore sizes and are therefore clearly identical to those present in the membrane (FIG. 4(b3)).

Figure 8:
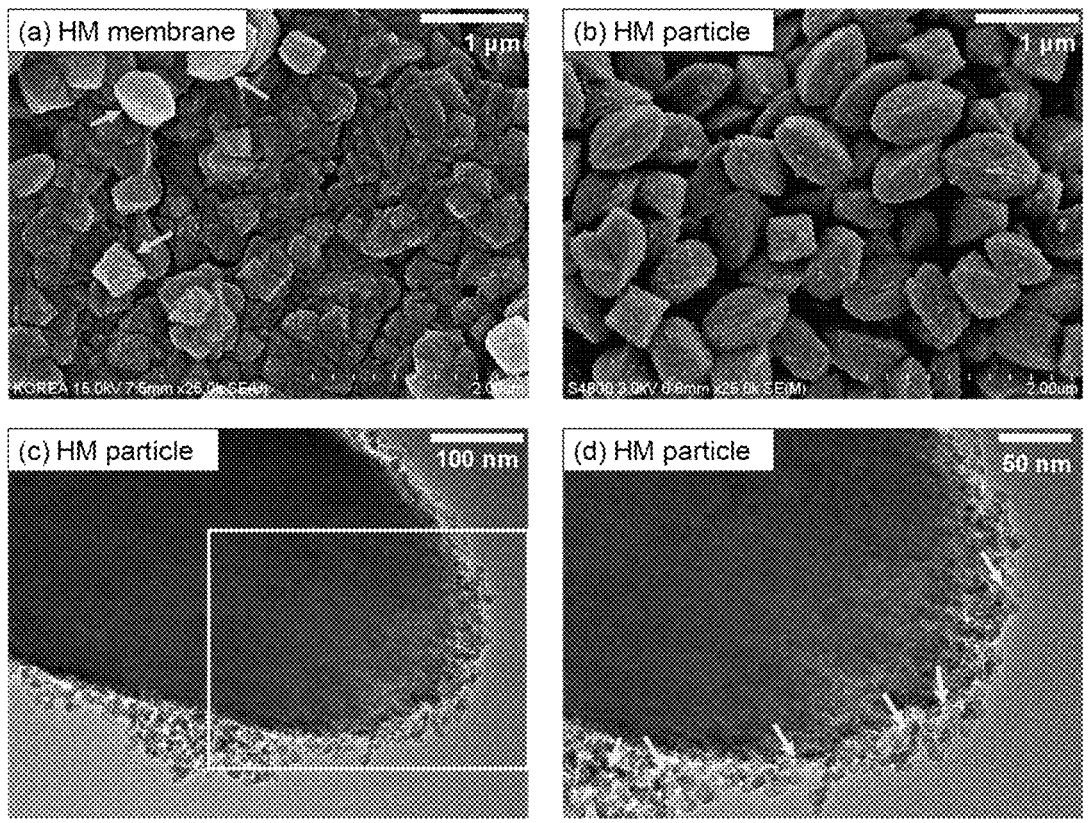
FIG. 8 shows SEM and TEM images of HM particles according to an embodiment of the present invention.
Figure 10:
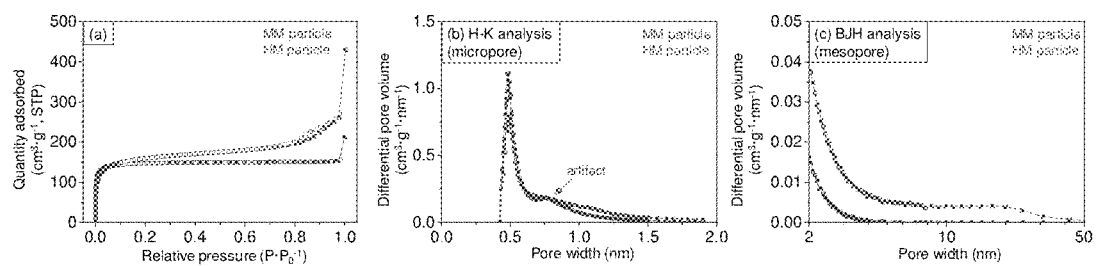
FIG. 10 is graphs showing H-K and BJH analysis results of the MM particles and the HM particles according to an embodiment of the present invention.

In consideration of the limitations of the microscopic representation of FIGS. 4a-b, the Ar physisorption properties of the $\alpha$-Al$_2$O$_3$ disc (having a macropore size of about 150 nm) and the membrane were confirmed. Since the proportion of the zeolite membrane is extremely low in the entire membrane, the Ar physisorption data of the MM and HM membranes, having micropores therein (FIG. 4(c1)), are similar to those of the bare disc (FIG. 4(c2)). Nevertheless, the BJH pore size distribution table (FIG. 4(c3)) clearly shows that the aforementioned mesopores (4-5 nm) exist only in the HM. Moreover, Ar physisorption isotherms of MM and HM particles were measured (FIG. 10). The micropore size distribution table of the two membrane samples is similar to that of each powder (FIG. 4(c2) and FIG. 10(b)). In particular, the MM particles and the HM particles had micropores corresponding to 10-membered ring (MR) channels having a diameter of about 0.5 nm, but an additional peak of about 0.7-0.8 nm was observed in the pore size distribution of the MM particles. This is related to structural changes due to Ar adsorption (E. Garcia-Perez et al., J. Phys. Chem. C 112, 9976-9979 (2008)). However, none of the HM membrane and particle samples contain artificial micropores having a size of 0.7-0.8 nm. In particular, the HM membrane showed a higher extent of micropores in the range of 0.6-2 nm. This indicates the presence of more severely disordered micropores, similar to the hierarchically structured HM particles (FIG. 10b). In addition, the Ar physisorption isotherm data (FIG. 10a) and the BJH pore size distribution table (FIG. 10c) clearly show that only the HM particles have a small amount of mesopores and a hierarchical structure. Unlike what has been reported for SPP particles (X. Y. Zhang et al., Science 336, 1684-1687 (2012)), the HM particles do not have jungle-gym-shaped self-pillared mesopores (FIGS. 8(c)-(d)). Since only the amount of water was increased in the present invention, the importance of a small amount of water in the original recipe is strongly supported. Instead, the HM particles appear to grow due to the aggregation of small particles, indicating the formation of mesopores therebetween. Also, in the HM membrane, grains having mesopores therein (FIGS. 4(a2)-(a3) and (b2)-(b3)) appear to be gathered. Although the membrane has very low intensity due to the low proportion, the peak observed in the BJH distribution (FIG. 4(c3)) clearly shows that there are mesopores inside the membrane. Therefore, together with the TEM images (FIG. 4(a1)-(b3)), it can be concluded that, for the first time, isolated spherical mesopores (approximately 2-5 nm) were successfully formed inside the zeolite membrane. Taking into consideration the mass of the two types of membranes, having similar membrane thicknesses, the higher mesopore volume of the HM membrane in FIG. 4(c3) appears to be due to the more severely disordered membrane structure, as mentioned above.

Example 2: Confirmation of p-Lo-Xylene Separation Performance of Hierarchically Structured MIF Membrane In order to measure the separation performance of the zeolite membrane for the p-lo-xylene mixture at the same ratio, the Wicke-Kallenbach method was performed while maintaining the feed side and the permeate side at a pressure of 1 atm. He gas was used as a sweep gas that allows the molecule passed through the membrane to move to the column in GC. He gas also served as a carrier gas that allows the sample to move to the sample loop. In order to include xylene in the feed gas, He gas was passed through a bubbler containing liquid p-xylene and o-xylene. Since the vapor pressure of p-xylene (vapor pressure at 26° C.: 1.24 kPa) is different from the vapor pressure of o-xylene (vapor pressure at 26° C.: 0.93 kPa), the flow rate of He gas was set to 41 mL·min$^{-1}$ in p-xylene and to 54 mL·min$^{-1}$ in o-xylene. The final feed gas contained 0.5 kPa of p-xylene and 0.5 kPa of o-xylene. In addition, for single-component-based permeation measurement, the flow rates of He gas passing through the bubbler containing p-xylene and o-xylene were set to 41 and 54 mL·min$^{-1}$, respectively. He gas was passed through one bubbler, and pure He gas was added so that the total amount of feed gas was 95 mL·min$^{-1}$. On the permeate side, 95 mL·min$^{-1}$ of helium was used as the sweep gas, as in the feed. The permeate gas was transferred to a GC (Agilent 7080A), passed through an Agilent HP-INNOWax column, and then measured using an FID (flame ionization detector). In order to increase the reliability of quantification of the permeate gas, CH$_4$ gas (3 mL·min$^{-1}$) as a reference gas was added in a constant amount to the line before injection into the GC. Finally, a long-term p-lo-xylene separation performance test of the MM and HM membranes was performed at 275° C. (the maximum temperature of the oven (DX302, Yamato Scientific Co.)) for 200 hours.

Figure 5:
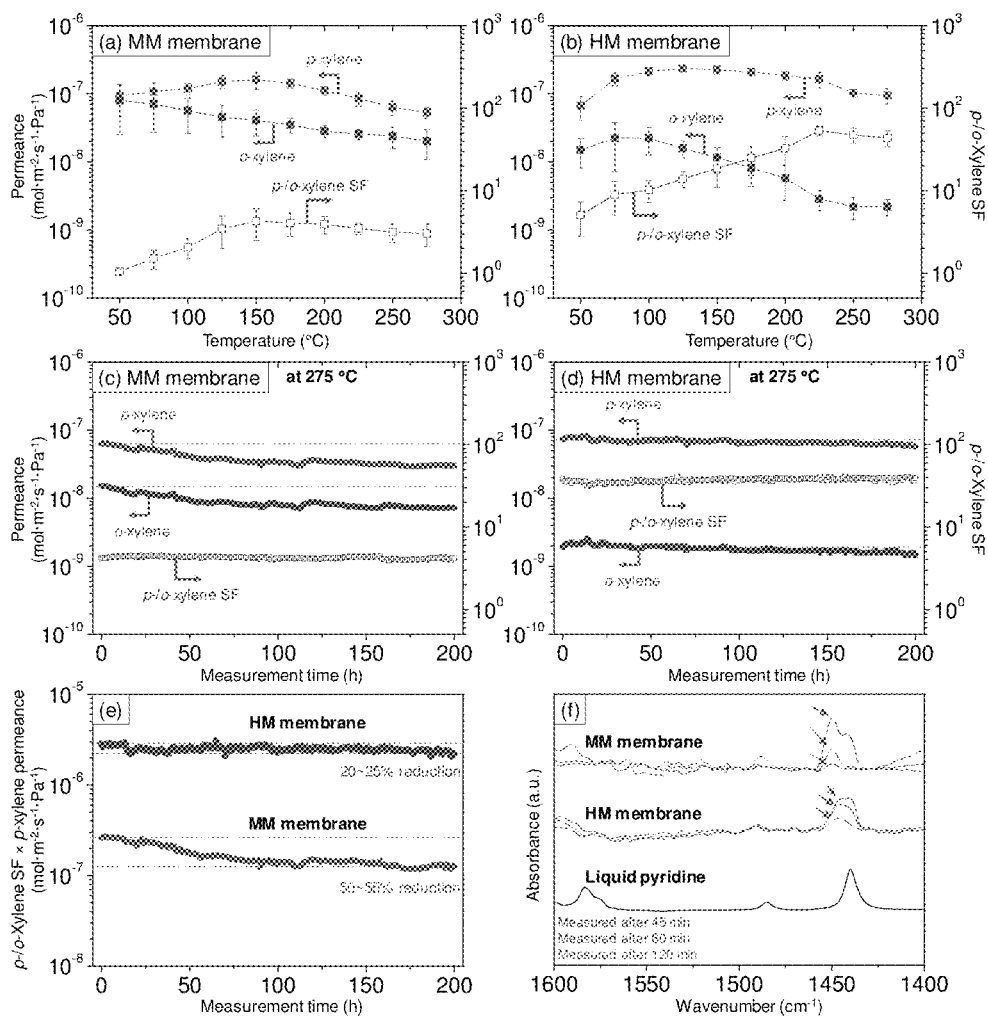
FIG. 5 shows the test results of separation performance and long-term stability of the MM membrane and the HM membrane according to an embodiment of the present invention, and the results of analysis of acid sites using FT-IR.

FIG. 5(a) shows low p-lo-xylene separation performance at the measured temperature (ca. 50-275° C.). In particular, the maximum p-lo-xylene separation factor (SF) was observed to be 4.3 at 150° C. This low separation performance has been consistently reported in the past (G. Xomeritakis et al., Ind. Eng. Chem. Res. 40, 544-552 (2001); C. J. Gump et al., Ind. Eng. Chem. Res. 40, 565-577 (2001)). In contrast, the HM membrane shows greatly improved p-lo-xylene separation performance. At 225° C., the HM membrane exhibited a maximum p-lo-xylene SF of about 53.8±7.3 and a p-xylene permeance of about 1.6±0.4× 10$^{-7}$ mol·m$^{-2}$·s$^{-1}$·Pa$^{-1}$, which are much higher than those of the MM membrane (p-lo-xylene SF: about 3.5±0.5, and p-xylene permeance: about 0.86±0.2×10$^{-7}$ mol·m$^{-2}$·s$^{-1}$·Pa$^{-1}$ at 225° C.). In particular, since refining and petrochemical industries require p-xylene separation at high temperatures, high performance in the high-temperature range of about 200-275° C. is desirable (U.S. Pat. Nos. 6,376,733; 9,227, 891; 6,646,177). Despite the use of the same seed layer and similar membrane thickness, the HM membrane exhibited a great increase in p-lo-xylene separation performance. Interestingly, the permeation behavior of the HM membrane is similar to that of the b-oriented MFI membrane in the temperature range of about 50-225° C. (Z. P. Lai et al., Science 300, 456-460 (2003)). This suggests a similar number of defects. The low separation performance of the MM membrane may be regarded as a negative effect of defects, which is clearly demonstrated using the FCOM technique (FIGS. 6(a1)-(a3)). The cracks propagate to the interface of the porous support and incapacitate the molecular sieve-based separation. On the other hand, the HM membrane does not have cracks therein (FIGS. 6(b1)-(b3)), and thus has a high p-lo-xylene SF (FIG. 5(b)). Instead, bright dots (FIGS. 6(b1)-(b2), yellow arrow) are mainly observed on the surface of the membrane, but do not deteriorate the separation performance of the membrane.

Figure 6:
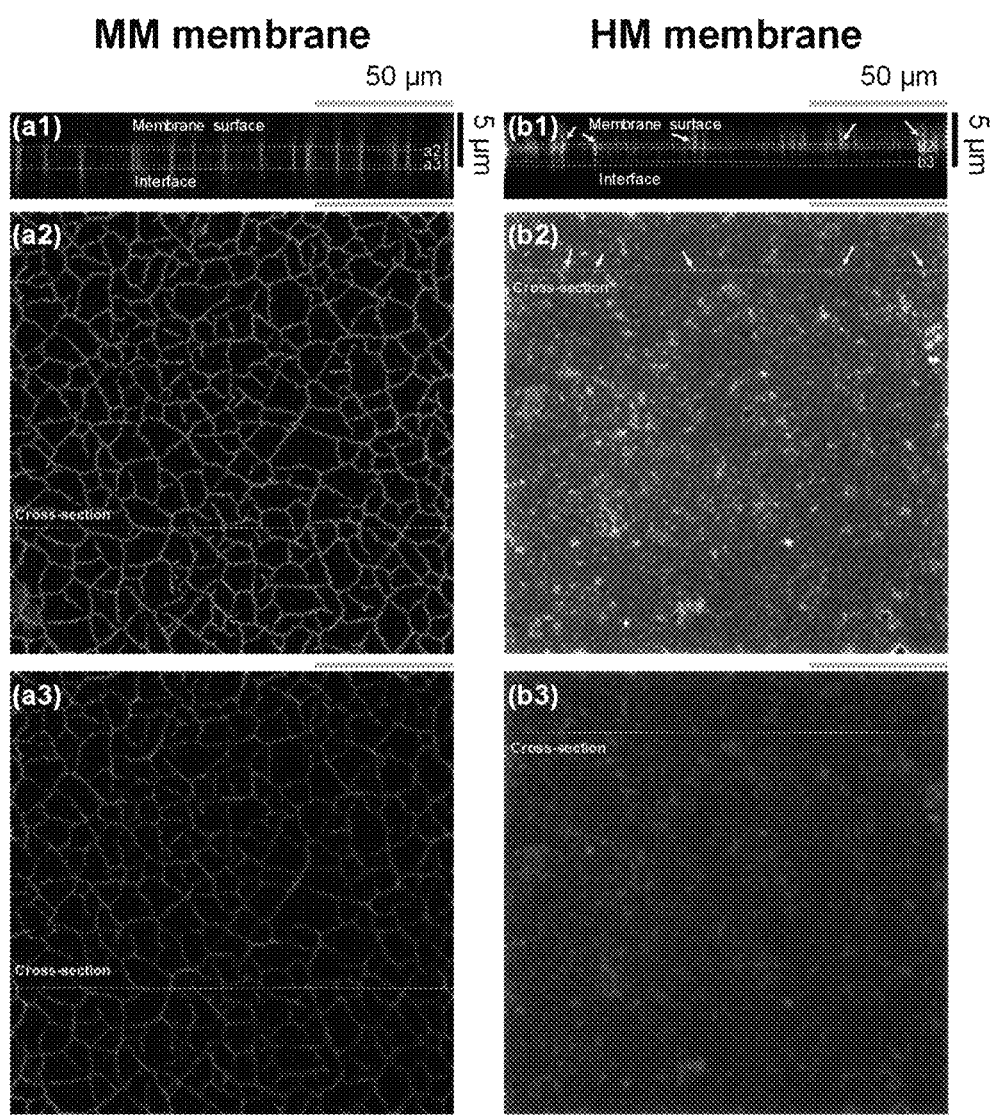
FIG. 6 shows images for analyzing the defect structures of the MM membrane and the HM membrane using FCOM according to an embodiment of the present invention.
Figure 11:
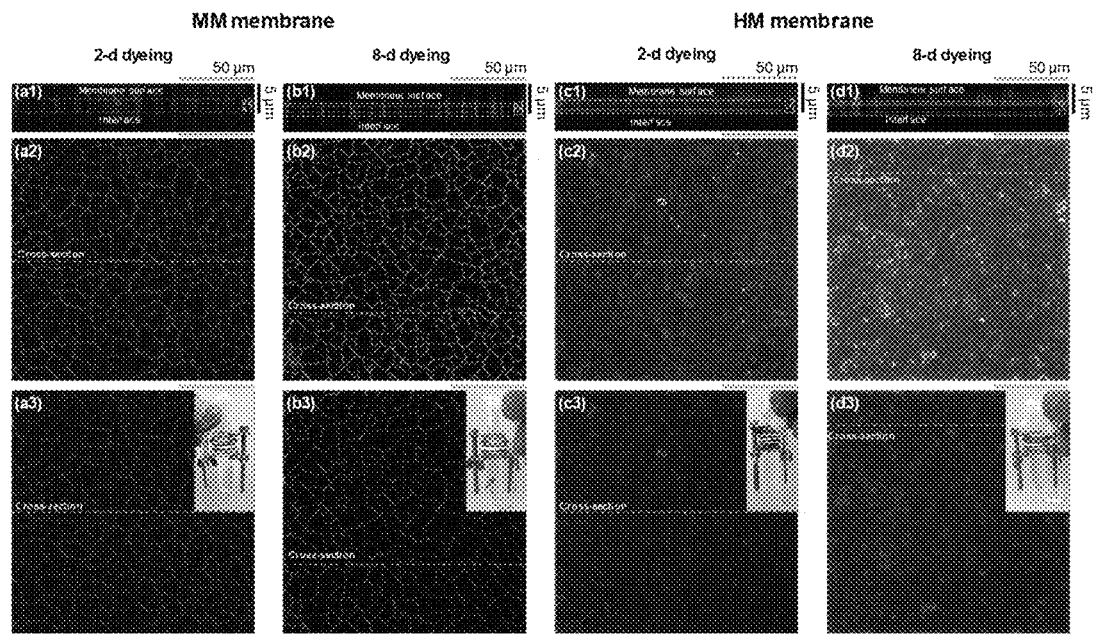
FIG. 11 is images showing the FCOM measurement results for analyzing the defect structure of the MM membrane and the HM membrane according to an embodiment of the present invention.

As shown in FIG. 6, although the dyeing time of the membrane samples was increased from 2 days to 8 days, the resulting FCOM images were similar, indicating that all defects were dyed after day 2 of dyeing. Moreover, the results of monitoring the dyeing process give information about defects (photographs showing dyeing results inserted in FIGS. 11(a3)-(d3)) (M. Lee et al., ACS Appl. Mater. Interfaces 11, 3946 3960 (2019)). Despite the similar defect forms, it can be seen from the photograph that the dye permeated the membrane only on day 8 of dyeing (FIG. 11(b3), red arrow). This indicates that the number of defects in the MM membrane is much higher than in the HM membrane. In addition, the mesopores identified through TEM and Ar physisorption measurements were not detected through FCOM measurement (FIGS. 6(b1)-(b3)). This clearly indicates that the extent of mutual growth between the particles is very high, making the HM membrane similar to a single-crystal membrane. Considering that the FCOM analysis of the rapidly thermally processed MFI membrane showed a discoidal empty space embedded in the middle of the membrane (J. Choi et al., Science 325, 590-593 (2009)), in the present invention, the FCOM results (FIGS. 6(b1)-(b3)) indicate that the mutual growth was better for the HM membrane. Therefore, it can be seen that the mesopores in the HM membrane are isolated and embedded between the micropores. Assuming that the effect of the defects between the particles of the HM membrane on the final performance is negligible, the observed high p-xylene permeance at the measured temperature and even at a high temperature of 225° C. could be related to the empty mesopores. This is because this space facilitates diffusion of p-xylene. Therefore, the effective diffusion length was reduced in the HM membrane, as reflected by the much higher p-xylene permeation rate. Specifically, the permeance of p-xylene is comparable to that of a thinner membrane having a predetermined orientation (1 μm thickness and b-out-of-plane orientation) (Z. P. Lai et al., Science 300, 456-460 (2003)). Nevertheless, performance measurement at high temperatures up to 275° C. showed that the HM membrane, having a microporous structure like Swiss cheese, is capable of maintaining high p-xylene permeance at high temperatures, indicating that the isolated and inserted mesopores have a beneficial effect.

Figure 12:
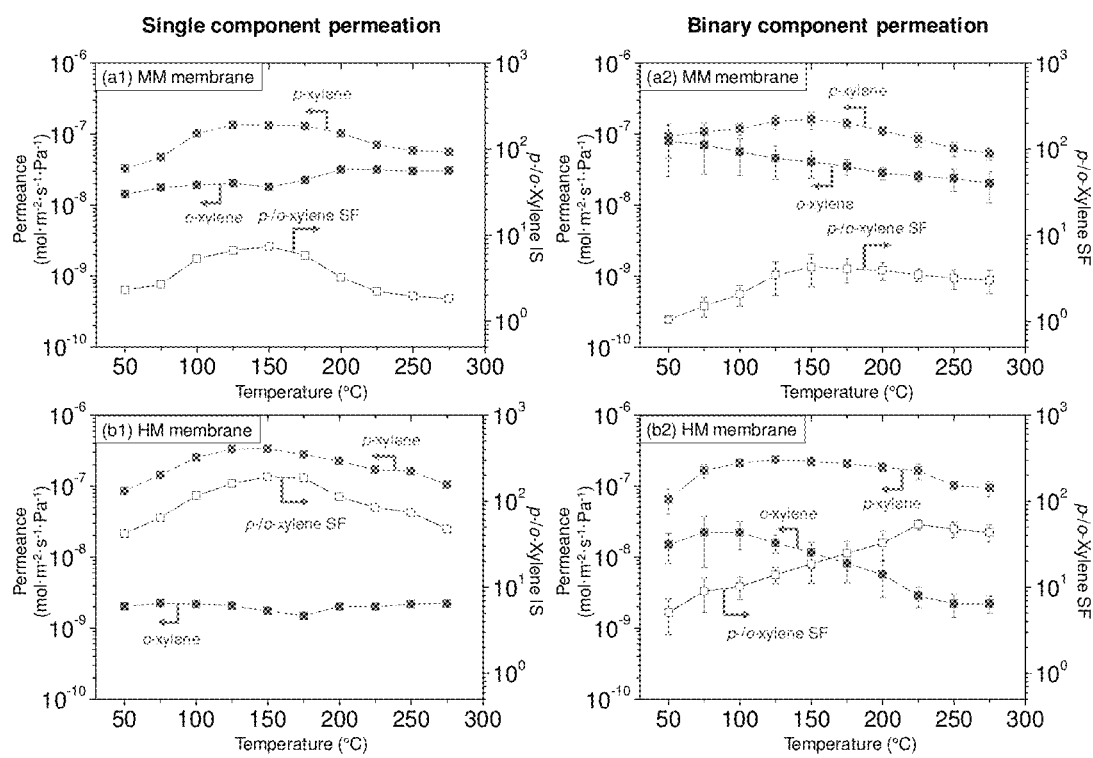
FIG. 12 is graphs showing the single gas permeation performance of the MM membrane and the HM membrane according to an embodiment of the present invention.

The difference in the separation performance of the MM and HM membranes due to defects (mainly cracks) can be understood based on the single-component permeation performance measurement results. It has been reported that, when p-xylene is adsorbed to the MFI structure, the MFI zeolite structure is modified (G. Xomeritakis et al., Microporous Mesoporous Mater. 38, 61-73 (2000)). In particular, p-xylene is adsorbed, and the grains in the MFI membrane are partially distorted due to structural changes in MFI zeolite, and thus defects between grains may be expanded (S. Hong et al., J. Membr. Sci. 569, 91-103 (2019)). FIG. 12 shows that the MM membrane having similar permeation behavior (FIGS. 12(a1)-(a2)) has a significant number of large defects, and o-xylene permeance is greatly increased in the binary component permeation rather than in the single component permeation (FIGS. 12(b1)-(b2)), indicating that the defects are more open in the HM membrane. The negative effect of defects thus enlarged was significant in the HM membrane, but the structural change induced by p-xylene adsorption was not important at high temperatures, so permeation behavior at 200° C. or higher was comparable (FIGS. 12(b1)-(b2)).

Figure 13:
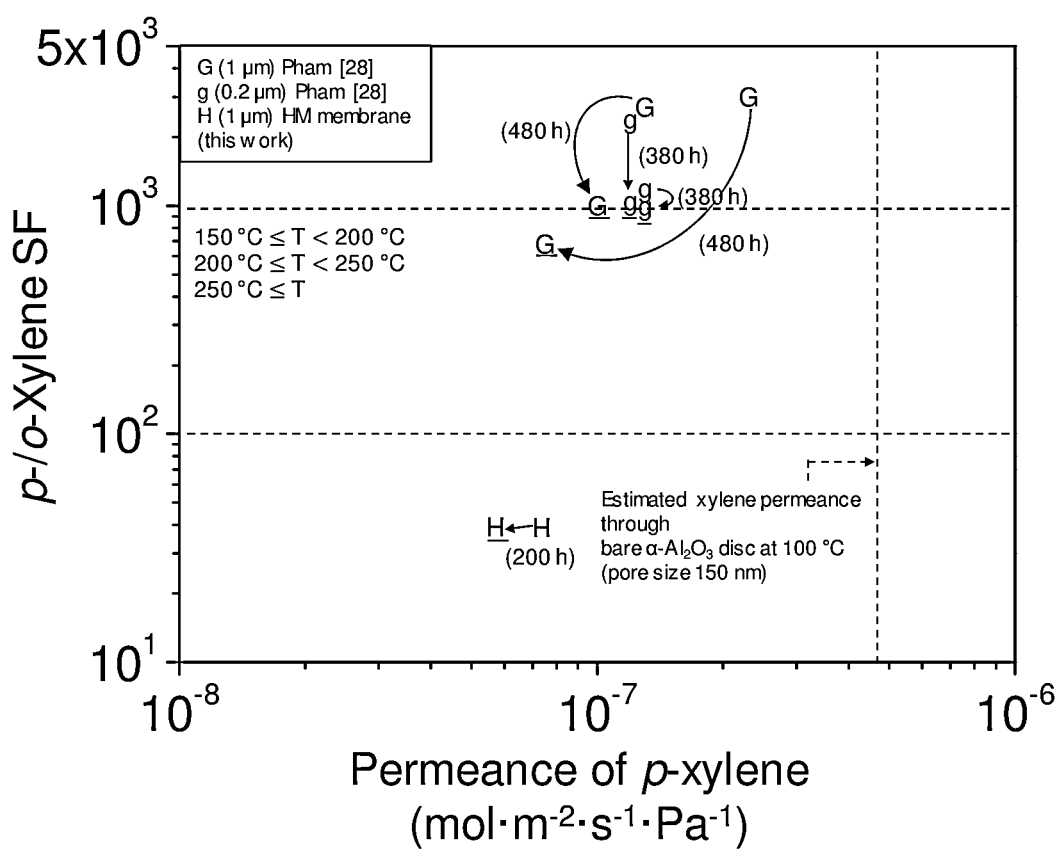
FIG. 13 is a graph showing long-term stability test results of selected membranes according to an embodiment of the present invention.
Figure 14:
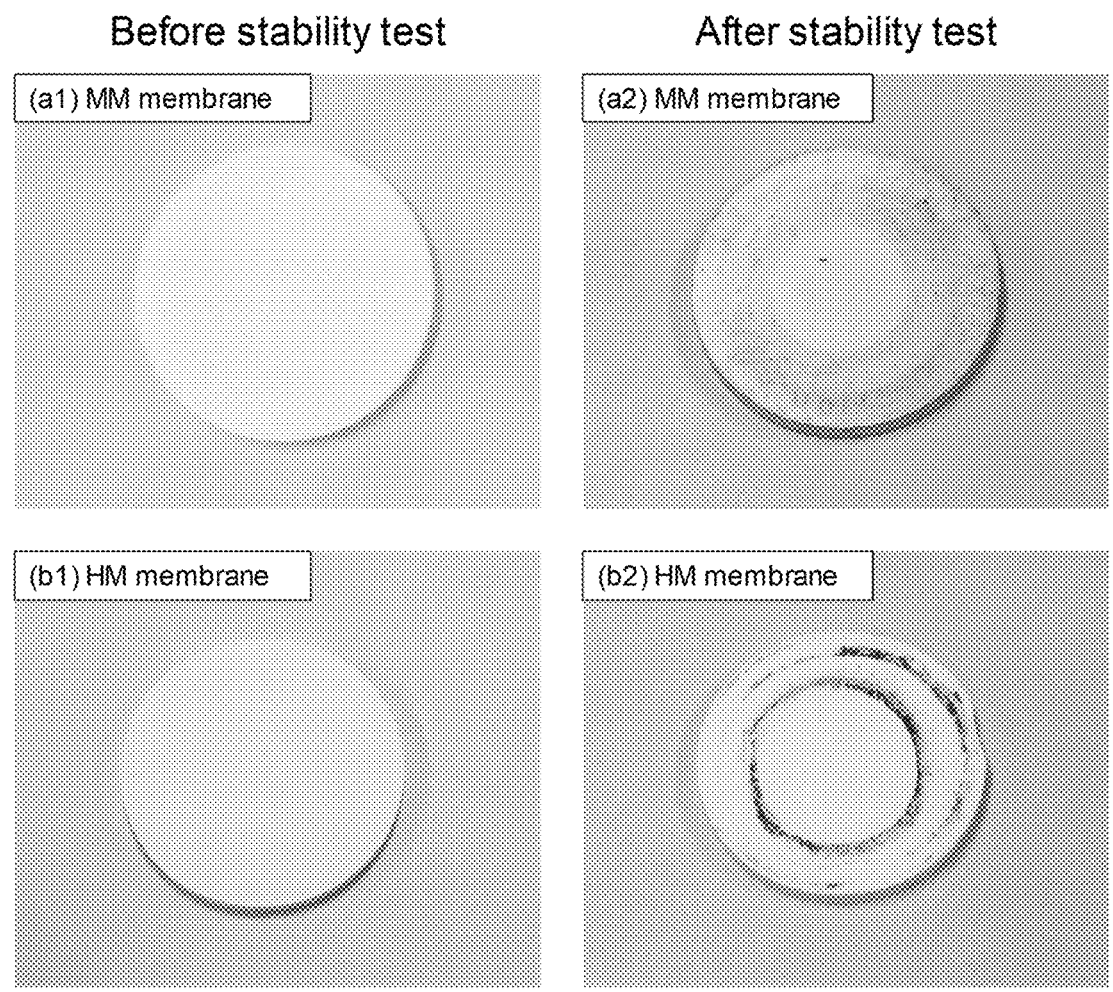
FIG. 14 is photographs showing changes in the color of the membranes after a long-term stability test according to an embodiment of the present invention.

Long-term thermal stability measurement of the MM and HM membranes was tested at 275° C. for up to 200 hours (FIGS. 5(c)-(d)), which corresponds to extremely harsh conditions on a laboratory scale. Actually, the p-lo-xylene permeance gradually decreased over time (MM membrane). In particular, the p-xylene permeance decreased by almost 50% from about $6.3 \times 10^{-8}$ mol·m$^{-2}$·s$^{-1}$·Pa$^{-1}$ to about $3.3 \times 10^{-8}$ (after 100 hours) and about $3.0 \times 10^{-8}$ mol·m$^{-2}$·s$^{-1}$·Pa$^{-1}$ (after 200 hours). Since o-xylene also shows a similar decrease, the p-lo-xylene SF value is maintained at 4. This decrease in performance is deemed to be because the micropores are clogged by o-xylene (T. C. T. Pham et al., Angew. Chem. Int. Ed. 52, 8693-8698 (2013)). On the contrary, in the HM membrane, both p- and o-xylene seldom decreased until 200 hours. In particular, the p-xylene permeance decreased from $7.4 \times 10^{-8}$ mol·m$^{-2}$·s$^{-1}$·Pa$^{-1}$ to $6 \times 10^{-8}$ mol·m$^{-2}$·s$^{-1}$·Pa$^{-1}$ after 200 hours. This shows that clogging due to the slower permeation of o-xylene as mentioned above has no effect on the HM membrane. This can be considered to be owing to a substantial decrease in the permeation length due to the mesopores present in the HM membrane. As shown in FIG. 13, long-term stability results of two different MFI membranes having thicknesses of 0.2 and 1 μm were reported in the literature (T. C. T. Pham et al., Angew. Chem. Int. Ed. 52, 8693-8698 (2013)), in which p-xylene permeance through the 0.2-μm-thick MFI membrane did not change even after 380 hours, and that of the 1-μm-thick MFI membrane decreased to 70% after 480 hours. This shows that the thin membrane is advantageous in avoiding coke formation, which explains the high thermal stability of the HM membrane. In addition, improved long-term thermal stability may be related to higher resistance to coke formation and catalyst deactivation in hierarchically structured zeolite (L. L. Wu et al., Chem. Commun. 48, 9492-9494 (2012): M. Milina et al., Nat. Commun. 5, 10 (2014)). Therefore, it can be expected that the mesopores embedded in the membrane are capable of preventing coke formation by providing a space for slower permeating components between the microporous channels. After the stability test, the MM membrane turned dark brown due to coke formation (FIG. 14). Interestingly, in both membranes, p-xylene and o-xylene decreased similarly, maintaining the p-lo-xylene SF for 200 hours.

In addition, the separation performance of the membrane is represented as flux (related to the recovery rate of the target molecule in the feed gas) and SF (related to the purity of the target molecule). Although these two attributes should be considered simultaneously, the latter is often considered more important. In this regard, the performance of the two membranes was evaluated through product values thereof based on the results shown in FIGS. 5(c)-(d) (FIG. 5(e)). The product value of the HM membrane is one order of magnitude higher than that of the MM membrane, which supports the high p-xylene separation performance of the HM membrane. In addition, the separation performance for the product value of the HM membrane was well maintained and thus decreased by only about 20-25%, but the MM membrane greatly decreased by about 50-55%.

Figure 15:
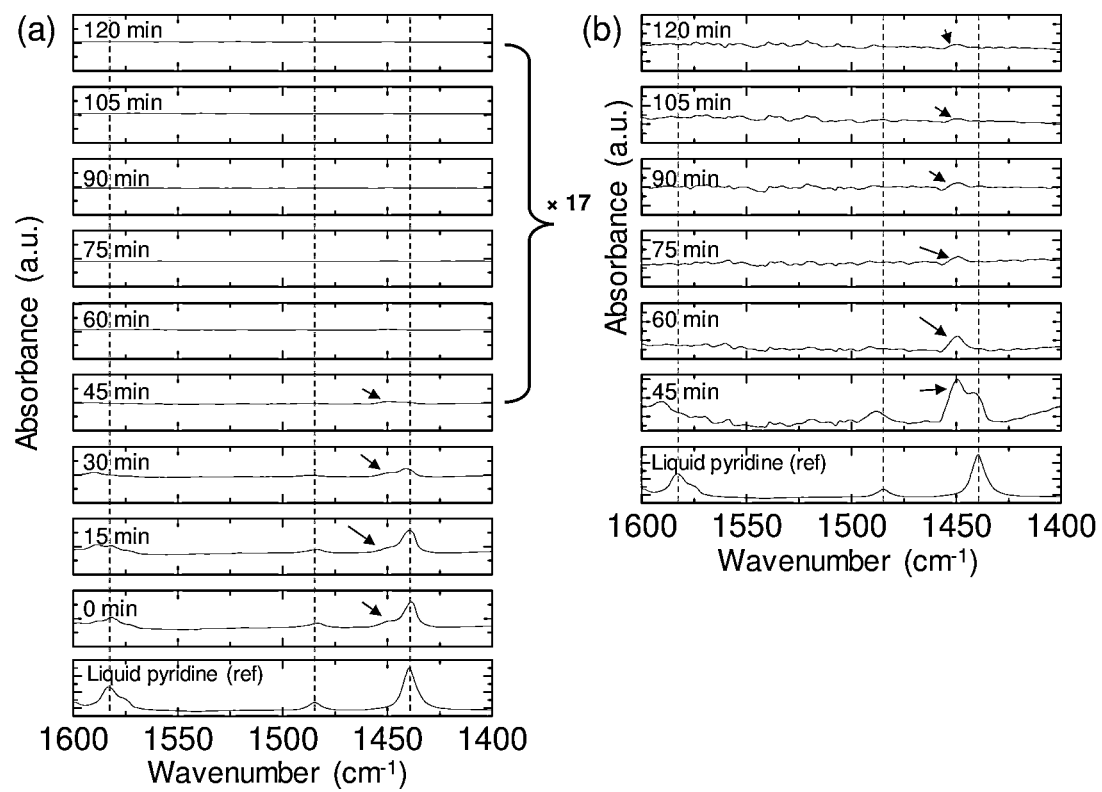
FIG. 15 is graphs showing FT-IR measurement results of the MM membrane according to an embodiment of the present invention.
Figure 16:
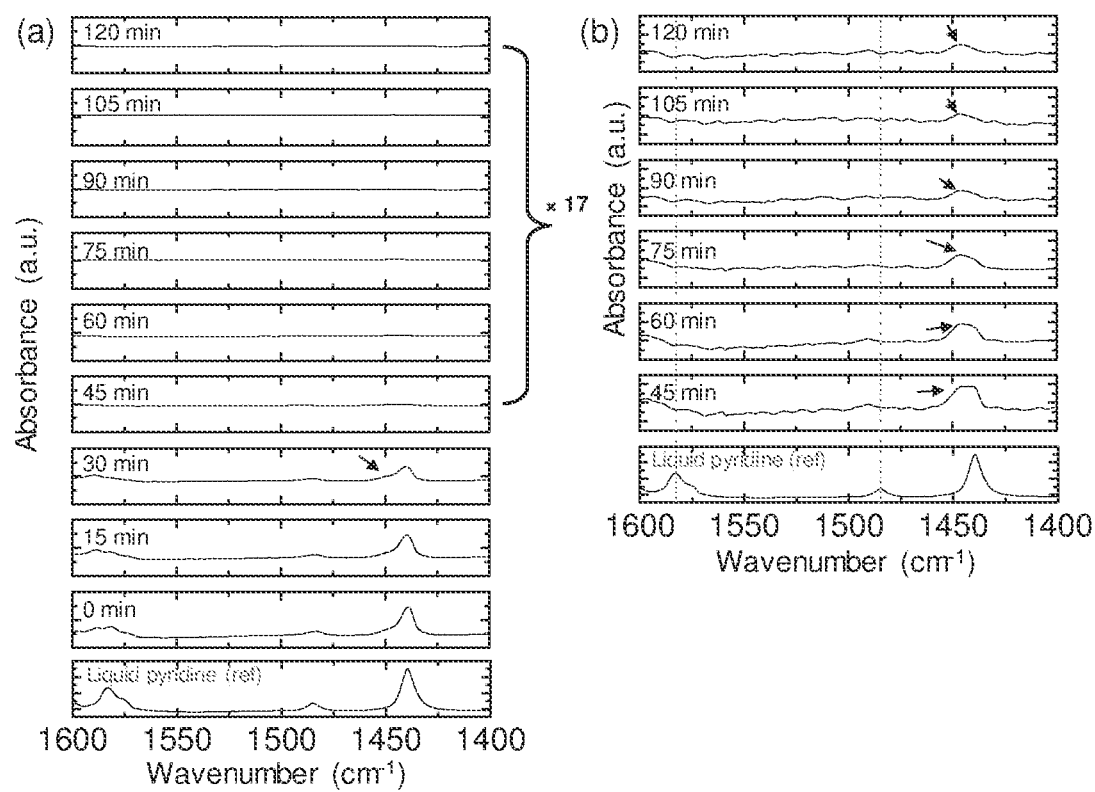
FIG. 16 is graphs showing FT-IR measurement results of the HM membrane according to an embodiment of the present invention.

It is known that the presence of a phosphorus atom in the zeolite structure inhibits the formation of coke-causing Bronsted acid sites (H. J. Cho et al., ChemCatChem 9, 398-402 (2017)). Because the SDA used for synthesis of the HM membrane contains a phosphorus atom, the weak acid sites or the small number of acid sites of the HM membrane may explain the improvement in the long-term stability of the membrane. An MFI membrane in which all components are silica may be actually desirable in order to avoid pore blocking due to coke formation associated with the Bronsted acid sites (H. J. Cho et al., ChemCatChem 9, 398-402 (2017)). However, since the alumina disc is used as a support, it is difficult to prevent Al atoms from leaching out during synthesis. Although the synthesis solution for each of the HM and MM membranes does not contain Al, the leached Al may act as an Al source capable of forming acid sites. In order to confirm the contribution of acid sites, FT-IR analysis was performed. Specifically, the FT-IR spectra of the two membrane samples were obtained by slip-coating the surface with liquid pyridine and then performing measurement at intervals of 45, 60, and 120 minutes (FIG. 5(f)). Detailed FT-IR spectral data measured at 15-minute intervals for 120 minutes are shown in FIGS. 15 and 16. With reference to the previous FT-IR-based titration method (H. Kim et al., Catal. Today 314, 78-93 (2018)), no additional Al source was added to the synthesis solution, so neither membrane contained Bronsted acid sites. Nevertheless, similar Lewis acid sites was observed in both membranes, indicating that the chemical compositions of the two membranes were similar, as expected from the EDX result of FIG. 9. It can be concluded that the phosphorus atom present in the SDA did not contribute to the high long-term thermal stability performance of the HM membrane. Therefore, the resistance to the decreased separation performance in the HM membrane observed in FIG. 5(d) is likely due to a physical difference, that is, additional mesopores, which helps to avoid the pore blocking phenomenon described above.

Figure 17:
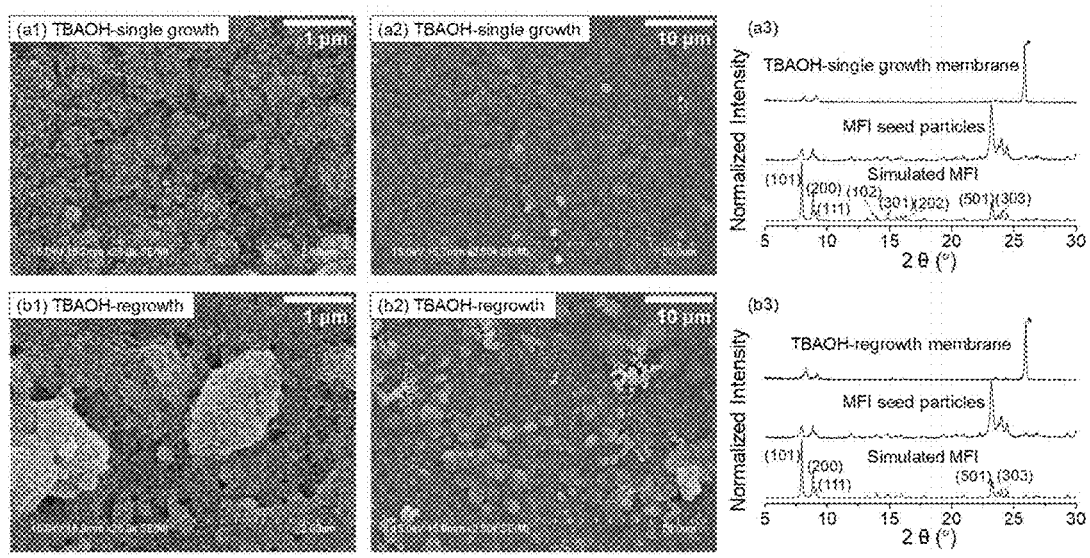
FIG. 17 is SEM images and XRD graphs of the HM membrane made using TBAOH according to an embodiment of the present invention.
Figure 18:
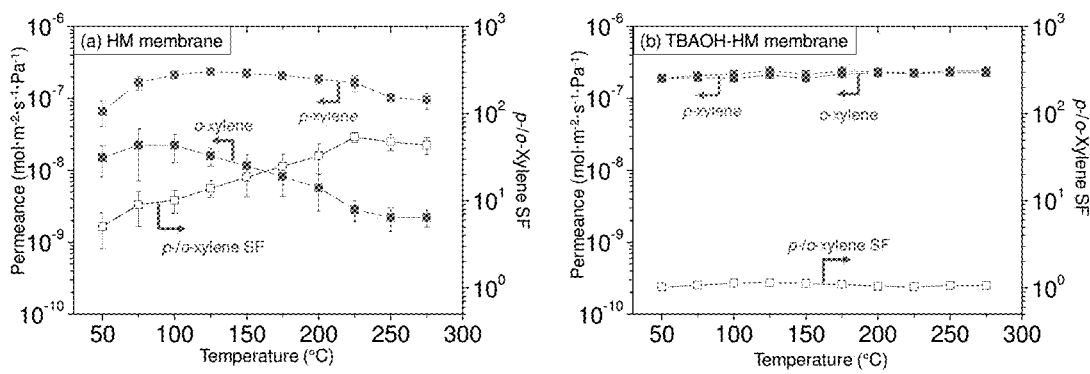
FIG. 18 is graphs showing the permeation performance results of the HM membrane made using TBAOH according to an embodiment of the present invention.

Attempts were made to manufacture an actual HM membrane using TBAOH (40 wt % in H$_2$O, Sigma Aldrich) including no phosphorus atom (FIG. 17). However, the HM membrane made of TBAOH exhibited no separation performance (FIG. 18), and more careful efforts are needed to optimize the synthesis conditions.

Figure 19:
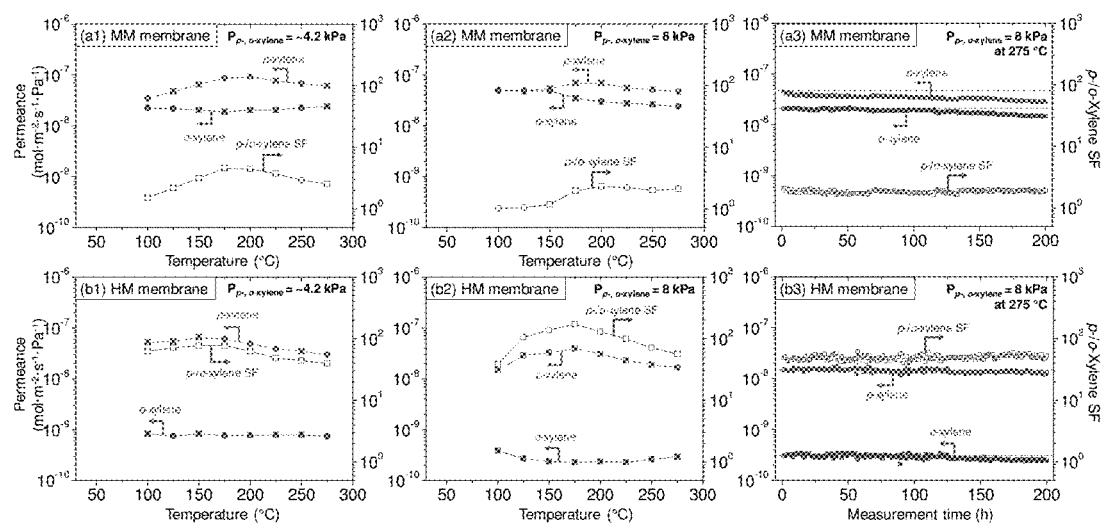
FIG. 19 is graphs showing the test results of separation performance and long-term stability of the MM membrane and the HM membrane depending on changes in the composition of p-lo-xylene in the feed gas according to an embodiment of the present invention.

In addition, separation performance was measured after increasing the partial pressures of p-xylene and o-xylene from 0.5 kPa to 4.2 and 8 kPa in the feed gas (FIG. 19). For the MM membrane, the separation performance deteriorated with an increase in the amount of xylene in the feed gas (FIGS. 19(a1)-(a2)), but the HM membrane showed a different pattern. When the amount of xylene in the feed gas was increased at 275° C., the separation factor of the HM membrane was increased from 43 to 56 (FIGS. 19(b1)-(b2)). This indicates that the HM membrane is more practical than the MM membrane under conditions of feed gas having the high xylene composition in which the actual process is performed. Moreover, thermal stability was measured while a temperature of 275° C. was maintained for 200 hours in a feed gas composition containing 8 kPa of p-xylene and o-xylene (FIGS. 19(a3)-(b3)). As shown in FIGS. 5(c)-(d), for the MM membrane, the p-xylene permeance decreased over time, and for the HM membrane, the p-xylene permeance was maintained for 200 hours. This is also attributed to a substantial decrease in the permeation length due to the mesopores in the HM membrane as described above.

Figure 7:
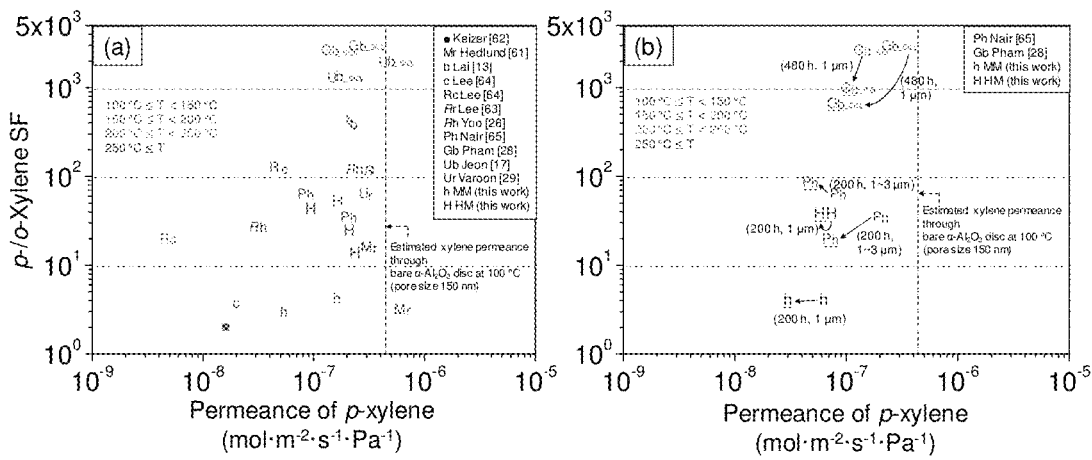
FIG. 7 shows graphs comparing the separation performance of the membrane according to an embodiment of the present invention with other MFI membranes through literature searches.

The p-xylene-preferred separation performance of the HM membrane was evaluated and compared with that of other MFI membranes reported in the literature (Z. P. Lai et al., Science 300, 456-460 (2003); M. Y. Jeon et al., Nature 543, 690-694 (2017); W. C. Yoo et al., Angew. Chem. Int. Ed. 49 Angew. Chem. Int. Ed. 49, 8699-8703 (2010); K. Varoon et al., Science 334, 72-75 (2011); J. Hedlund et al., Microporous Mesoporous Mat. 52, 179-189 (2002); K. Keizer et al., J. Membr. Sci. 147, 159-172 (1998); P. S. Lee et al., J. Am. Chem. Soc. 133, 493-502 (2011); T. Lee et al., J. Membr. Sci. 436, 79-89 (2013); S. Nair et al., Microporous Mesoporous Mater. 48, 219-228 (2001)). In FIG. 7(a), it was confirmed that it is very difficult to manufacture a membrane having a p-lo-xylene SF of 10 using a conventional MFI membrane. Additional processes such as post-treatment with silica sol, formation of a suitable seed layer, and special thermal processing are required in order to obtain performance of about 10 or more (W. C. Yoo et al., Angew. Chem. Int. Ed. 49, 8699-8703 (2010); S. Nair et al., Microporous Mesoporous Mater. 48, 219-228 (2001)). Furthermore, stringent conditions that minimize non-zeolitic moieties such as defects (in-plane growth (M. Y. Jeon et al., Nature 543, 690-694 (2017)), in-plane and out-of-plane epitaxial growth (Z. P. Lai et al., Science 300, 456-460 (2003)), and synthesis method without an additional silica source (T. C. T. Pham et al., Angew. Chem. Int. Ed. 52, 8693-8698 (2013)) were necessary in order to obtain extremely high p-xylene separation performance (p-lo-xylene SF of 100 or more).

The practical efforts of many researchers have improved the p-xylene permselectivity of MFI membranes. Nevertheless, complicated and delicate methods for obtaining high separation performance are not suitable for practical industrial use. Although the production of p-xylene requires a p-xylene separation process at a high temperature (U.S. Pat. Nos. 6,376,733; 9,227,891; 6,646,177), most studies focus only on separation performance in a moderate temperature range of 100-200° C. (most patterns are represented in blue/green in FIG. 7(a)). However, the HM membrane according to the present invention exhibits remarkable separation performance, as well as a high p-xylene molar flux at a high temperature of 275° C., thus satisfying such conditions in a favorable manner (FIG. 7(a)). In addition, the HM membrane is advantageous in that it can be manufactured through a simple secondary growth method using commercially available TBPOH as SDA.

FIG. 7(b) shows that the MFI membrane is mostly decreased in separation performance in the temperature range of 125-200° C. (about 25-70%, specifically decreased by about 25-70% from the initial p-xylene permeance) (T. C. T. Pham et al., Angew. Chem. Int. Ed. 52, 8693-8698 (2013); S. Nair et al., Microporous Mesoporous Mater. 48, 219-228 (2001)). Among the membranes investigated in the long-term experiment, only the HM membrane showed a small decrease in p-xylene permeance. In practice, stability of the separation device is very important for use in the oil refining and petrochemical industries. Considering that the highest temperature of 275° C. was adopted for the long-term stability test, it can be seen that an HM membrane exhibiting only a slight decrease in performance holds promise for practical use. Specifically, the p-xylene permeance decreased by 23% in 200 hours. Since the p-lo-xylene SF of the HM membrane was maintained well, at about 40, it is possible to predict performance over time linearly. Interestingly, it was found that the performance of the MFI membrane, which was prepared on the surface of a porous $SiO_2$ support but in which all components were silica, inevitably deteriorates over time (T. C. T. Pham et al., Angew. Chem. Int. Ed. 52, 8693-8698 (2013)). The mesopores embedded in the HM membrane enable rapid transport of a p-xylene molecule, which is a target molecule, and more importantly prevent deterioration of the performance of the membrane. This strongly supports the importance of introduction of additional mesopores into conventional zeolite membranes.

It was confirmed that it was possible to manufacture a membrane having high flux and selectivity for the first time by successfully introducing mesopores into conventional microporous zeolite, and that extrinsic mesopores contributed to improved membrane performance. Such a zeolite membrane takes a form resembling, for example, Swiss cheese. As is apparent from both TEM and Ar adsorption analysis, the HM membrane contains isolated mesopores having a size of 2-5 nm therein. Despite having a similar thickness (about 1 μm), the hierarchically structured HM membrane exhibited a vastly high p-xylene molar flux and p-lo-xylene selectivity at a very high temperature of 225° C. ($1.6 \times 10^{-7}$ vs. $0.86 \times 10^{-7}$ mol·m$^{-2}$·s$^{-1}$·Pa$^{-1}$ and 53.8 vs. 3.5, compared to the MM membrane). Such high p-xylene permselectivity results from fewer defects (i.e. better polycrystalline grain growth). The high long-term stability appears to be due to the mesopores. Here, the mesopores are capable of effectively preventing the membrane from pore blocking by coke formation. Furthermore, the well-known secondary growth method can be directly applied to the synthesis of the HM membrane using TBPOH as an easily commercially available SDA. This allows reliable reproducible synthesis of the HM membrane.

INDUSTRIAL APPLICABILITY

According to the present invention, it is possible to manufacture a membrane having high flux and selectivity due to contribution of extrinsic mesopores to improved membrane performance by successfully introducing mesopores into general microporous zeolite. Also, permeance can be advantageously increased due to a substantial decrease in the diffusion length of a mixture that permeates the membrane through the mesopores. In addition, the thickness of the membrane can be maintained as it is, thereby retaining mechanical strength. Despite having a similar thickness (about 1 μm), the hierarchically structured HM membrane can exhibit a vastly high p-xylene molar flux and high p-lo-xylene selectivity at very high temperatures due to the low defect density thereof.

In particular, the membrane contains mesopores therein and thus shows high long-term stability, and the mesopores are capable of effectively preventing the membrane from pore blocking by coke formation.

The method of synthesizing a hierarchically structured zeolite membrane having mesopores therein according to the present invention is capable of synthesizing a hierarchically structured membrane through a single process using an organic structure-directing agent that is useful for synthesizing hierarchically structured zeolite particles. This method is simple compared to conventional methods that have been researched with the goal of increasing permeance, and is thus expected to be suitable for large-scale synthesis of membranes. Moreover, since the membrane is synthesized using a commercially available organic structure-directing agent, there is an advantage in that a complicated process of making a certain organic structure-directing agent for forming a hierarchical structure can be omitted.

The hierarchically structured zeolite membrane manufactured according to the present invention has both high permeance and high separation performance through micropores. Moreover, by virtue of the mesopores therein, the membrane is capable of preventing separation performance from deteriorating even in a high-temperature separation process for a long period of time and of maintaining almost constant permeance, thus making it suitable to apply to actual membrane processing.

Although specific embodiments of the present invention have been disclosed in detail above, it will be obvious to those of ordinary skill in the art that the description is merely of preferable exemplary embodiments and is not to be construed as limiting the scope of the present invention. Therefore, the substantial scope of the present invention is to be defined by the appended claims and equivalents thereof.

The invention claimed is:

1. A hierarchically structured zeolite membrane having a thickness of 0.1 to 5 μm and comprising micropores having a size of 2 nm or less and mesopores having a size of 2 to 20 nm,
    wherein the hierarchically structured zeolite membrane comprises MFI zeolite and MEL zeolite, and
    wherein the mesopores are isolated and embedded between the micropores.

* * * * *